US012750558B2

(12) United States Patent
Kang et al.

(10) Patent No.: US 12,750,558 B2
(45) Date of Patent: Sep. 29, 2026

(54) METHOD FOR PROVIDING CONTENT ALLOWING VIEWER PARTICIPATION AND ELECTRONIC DEVICE THEREFOR

(71) Applicant: SAMSUNG ELECTRONICS CO., LTD., Suwon-si (KR)

(72) Inventors: Donggoo Kang, Suwon-si (KR); Hyunjin Kim, Suwon-si (KR); Miyoung Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/659,510

(22) Filed: May 9, 2024

(65) Prior Publication Data

US 2024/0298076 A1 Sep. 5, 2024

Related U.S. Application Data

(63) Continuation of application No. PCT/KR2022/014269, filed on Sep. 23, 2022.

(30) Foreign Application Priority Data

Nov. 22, 2021 (KR) ........................ 10-2021-0161434
Dec. 6, 2021 (KR) ........................ 10-2021-0173155

(51) Int. Cl.
*H04N 21/4788* (2011.01)
*H04N 21/431* (2011.01)

(52) U.S. Cl.
CPC ..... *H04N 21/4788* (2013.01); *H04N 21/4312* (2013.01)

(58) Field of Classification Search
None
See application file for complete search history.

(56) References Cited

U.S. PATENT DOCUMENTS 9,386,354 B2 7/2016 Archibong et al.
2003/0101450 A1* 5/2003 Davidsson .............. H04L 51/04 348/E7.071

(Continued)

FOREIGN PATENT DOCUMENTS

EP 1446949 A1 8/2004
KR 20110080688 A 7/2011

(Continued)

OTHER PUBLICATIONS

International Search Report and Written Opinion corresponding to Application No. PCT/US2022/014269 filed on Sep. 23, 2022; Mailing Date Dec. 29, 2022; pp. 9.

(Continued)

*Primary Examiner* — William J Kim
(74) *Attorney, Agent, or Firm* — CANTOR COLBURN LLP

(57) ABSTRACT

According to various embodiments, an electronic device includes a communication module, a display, a memory, and at least one processor, where the at least one processor is configured to execute a plurality of instructions stored in the memory to: establish a connection between an external display device and the electronic device through the communication module; execute a message application in which the electronic device and at least one external electronic device can participate; obtain, on the basis of the connection between the external display device and the electronic device, data related to a content displayed on the external display device; and display an execution screen of the message application on the display, the execution screen changing in response to the data related to the content.

8 Claims, 21 Drawing Sheets

(56) References Cited

U.S. PATENT DOCUMENTS

| | | | | |
|---|---|---|---|---|
| 2004/0031063 | A1* | 2/2004 | Satoda | H04N 21/2381 348/E7.071 |
| 2010/0064307 | A1* | 3/2010 | Malhotra | H04N 21/63775 725/86 |
| 2012/0177067 | A1 | 7/2012 | Cho et al. | |
| 2013/0291037 | A1 | 10/2013 | Im et al. | |
| 2013/0304820 | A1* | 11/2013 | Vasquez | H04N 21/44218 709/204 |
| 2014/0067828 | A1 | 3/2014 | Archibong et al. | |
| 2014/0068692 | A1* | 3/2014 | Archibong | H04N 21/4334 725/116 |
| 2015/0208140 | A1* | 7/2015 | Choi | H04N 21/6125 725/32 |
| 2016/0127287 | A1 | 5/2016 | Oh et al. | |
| 2016/0191995 | A1* | 6/2016 | el Kaliouby | H04N 21/812 725/12 |
| 2016/0210116 | A1* | 7/2016 | Kim | G06F 40/274 |
| 2017/0034229 | A1 | 2/2017 | Wong et al. | |
| 2017/0078621 | A1* | 3/2017 | Sahay | G06F 40/131 |
| 2017/0251262 | A1* | 8/2017 | Bist | H04N 21/4756 |
| 2017/0308290 | A1* | 10/2017 | Patel | G06F 3/04817 |
| 2017/0344224 | A1* | 11/2017 | Kay | G06F 3/0482 |
| 2019/0244639 | A1* | 8/2019 | Benedetto | G11B 27/11 |
| 2019/0297167 | A1 | 9/2019 | Foerster et al. | |
| 2019/0342634 | A1 | 11/2019 | Folgner et al. | |
| 2021/0097468 | A1* | 4/2021 | Socolof | G06Q 10/06393 |
| 2021/0160581 | A1* | 5/2021 | Difrancesco | H04N 21/4884 |
| 2021/0203708 | A1 | 7/2021 | Emerson | |
| 2022/0404952 | A1* | 12/2022 | Cha | G06F 16/148 |

FOREIGN PATENT DOCUMENTS

| | | | |
|---|---|---|---|
| KR | 20120042702 | A | 5/2012 |
| KR | 20120091987 | A | 8/2012 |
| KR | 20130009446 | A | 1/2013 |
| KR | 20130075866 | A | 7/2013 |
| KR | 101331444 | B1 | 11/2013 |
| KR | 20150052184 | A | 5/2015 |
| KR | 20160067282 | A | 6/2016 |
| KR | 101763887 | B1 | 8/2017 |
| WO | 03045058 | A1 | 5/2003 |

OTHER PUBLICATIONS

Korean Office Action for Korean Application No. 10-2021-0173155; Report Mail Date Mar. 30, 2026 (10 Pages with partial English translation).

* cited by examiner

| CONTENT TYPE | COMMON FUNCTION | SPECIFIED FUNCTION |
|---|---|---|
| 820 TV SHOW/MOVIE (OTT) | 825 EMOJI/EFFECT FUNCTION (SPECIFIED EMOJI PROVIDED ACCORDING TO EACH CONTENT) | CONTROL CONTENT VIEWING (PLAY, PAUSE, ETC.) 821 |
| | | IDENTIFY BASIC INFORMATION, SUCH AS DIRECTOR, STARRING, AND EPISODE INFORMATION 822 |
| 830 SPORTS | | REPLAY GAME HIGHLIGHT 831 |
| | | TEAM, PLAYER INFORMATION, FORMATION, ETC. 832 |
| 840 CONCERT | | CHEERING ROD (SHOWN IN CONJUNCTION WITH CHEERING EFFECT ON TV) 841 |
| | | SING ALONG (KARAOKE) FUNCTION PROVIDING SUBTITLE 842 |

FIG. 8B 852 854 850 856 862 860 864 872 870 874

| CONTENT TYPE | THEME (CHAT WINDOW BACKGROUND) | | | EMOJI | | EFFECT (TV SCREEN LAYERED EFFECT) | |
|---|---|---|---|---|---|---|---|
| | CONTENT IMAGE | ● METAPHOR | ● MOOD | CONTENT | ● MOOD | COMMON | ● MOOD |
| TV SHOW/ MOVIE (OTT) | MAIN POSTER<br>SEASON/ EPISODE MAIN<br>TITLE | | BACKGROUND COLOR/TONE CHANGE | CHARACTER EMOJI | SORT EMOJIS IN ORDER OF PRIORITY ACCORDING TO REAL-TIME CONTEXT | DISTURBANCE TO VIEWING (X) | |
| SPORTS | GAME TITLE AND TEAM EMBLEM<br>PLAYER POSTER | GAME EVENT (OLYMPICS) | | | | BASIC EFFECT (FIRECRACKER, CHEERING, ETC.) | SORT EFFECTS IN ORDER OF PRIORITY ACCORDING TO REAL-TIME CONTEXT |
| CONCERT | CONCERT POSTER | | | SINGER CHARACTER EMOJI | | DISTURBANCE TO VIEWING (X) | |

● AI RECOGNITION OF IMAGE/SOUND (EFFECT, BGM)

FIG. 8C

METHOD FOR PROVIDING CONTENT ALLOWING VIEWER PARTICIPATION AND ELECTRONIC DEVICE THEREFOR

CROSS-REFERENCE TO RELATED APPLICATIONS

This application is a continuation application under, 35 U.S.C. § 111(a), of International Patent Application No. PCT/KR2022/014269, filed on Sep. 23, 2022, which claims priority to Korean Patent Application No. 10-2021-0161434, filed on Nov. 22, 2021, and Korean Patent Application No. 10-2021-0173155, filed on Dec. 6, 2021, the content of which in their entirety is herein incorporated by reference.

BACKGROUND

1. Field

Various embodiments of the disclosure relate to a viewer-participable content providing method and an electronic device therefor.

2. Description of Related Art

Currently, the scale of the content service business is expanding as content recommendations in various fields, such as news, education, history, and entertainment, are successfully commercialized. As awareness of content services changes, users are also willing to pay to view (or subscribe to) content services. The secret to the success of the content service provider is to allow users to view as much content as possible while staying connected to the service for as long as possible through recommended content.

Accordingly, the types of content provided by electronic devices are diversified. It is common for viewers to view content through an external display device (e.g., TV) using a dedicated line or channel, such as terrestrial or cable, but the viewers may also view the same content through an electronic device, such as a smartphone, using the Internet. For example, users may use Internet-based video services that provide various contents, such as drama or movies, through the Internet, such as over the top (OTT) services, as well as web contents.

As demand for viewing various content on electronic devices increases, user demand for providing additional services along with content viewing is also increasing. For example, a group of friends may chat about the content they are viewing on their respective electronic devices while viewing the same content displayed on an external display device (e.g., TV or monitor). The convergence of content viewing and viewer-participable communication may make it possible to provide viewers with an immersive experience.

Therefore, as the diverse needs of viewers increase, there is a need to develop a content viewing environment to be provided in a user-friendly manner.

However, a user may view content with other users physically distant at the same time while chatting with them. However, use of content is limited unless an external display device provides information related to content to the respective electronic devices of the viewer and other users.

Accordingly, a need arises to implement a function capable of providing broadcast content that may interoperate with the online community service (hereinafter, community service) (e.g., a messenger service or a message service) that the user participates in. For example, it is needed to implement a function of grasping, in real-time, information related to the content displayed on the screen of the external display device and reflecting the same to the community service (e.g., chat window) of the electronic device of the viewer.

SUMMARY

According to various embodiments, an electronic device includes a communication module, a display, memory, and at least one processor. The memory storing instructions that, when executed by the at least one processor, cause the electronic device to establish a connection between an external display device and the electronic device through the communication module, execute a message application that allows participation of the electronic device and at least one external electronic device, obtain data related to content displayed on the external display device based on the connection between the external display device and the electronic device, and display, on the display, an execution screen of the message application, which changes in response to the data related to the content.

According to various embodiments, a viewer-participable content providing method of an electronic device includes establishing a connection between an external display device and the electronic device, executing a message application that allows participation of the electronic device and at least one external electronic device, obtaining data related to content displayed on the external display device based on the connection between the external display device and the electronic device, and displaying an execution screen of the message application changing in response to the data related to the content.

According to various embodiments, a computer program product includes a storage medium storing instructions, when executed by at least one processor of an electronic device, cause the electronic device to perform a plurality of operations that include establishing a connection between an external display device and the electronic device, executing a message application that allows participation of the electronic device and at least one external electronic device, obtaining data related to content displayed on the external display device based on the connection between the external display device and the electronic device, and displaying an execution screen of the message application changing in response to the data related to the content.

BRIEF DESCRIPTION OF DRAWINGS

The above and other exemplary embodiments, advantages and features of this disclosure will become more apparent by describing in further detail exemplary embodiments thereof with reference to the accompanying drawings, in which:

FIG. 8B is a view illustrating a mapping table of community service functions providable according to content types according to various embodiments;

FIG. 8C is a view illustrating a mapping table of effects providable in a community service according to content types according to various embodiments;

The same or similar reference denotations may be used to refer to the same or similar elements throughout the specification and the drawings.

DETAILED DESCRIPTION

Various embodiments of the disclosure relate to a viewer-participable content providing method and an electronic device therefor, which may provide a community service that changes according to the content displayed on the external display device.

According to various embodiments, the viewer may experience bi-directional interoperation by grasping, in real-time, information related to content displayed on the screen of the external display device and reflecting the same to the community service screen displayed on the electronic device.

According to various embodiments, it is possible to provide a user-participatory content that may arouse the viewer's interest by displaying content to which the effect reflecting the content analysis results has been applied on the external display device and displaying a community service screen that changes in relation to the content analysis results on the electronic device.

Effects of the disclosure are not limited to the foregoing, and other unmentioned effects would be apparent to one of ordinary skill in the art from the following description.

Figure 1:
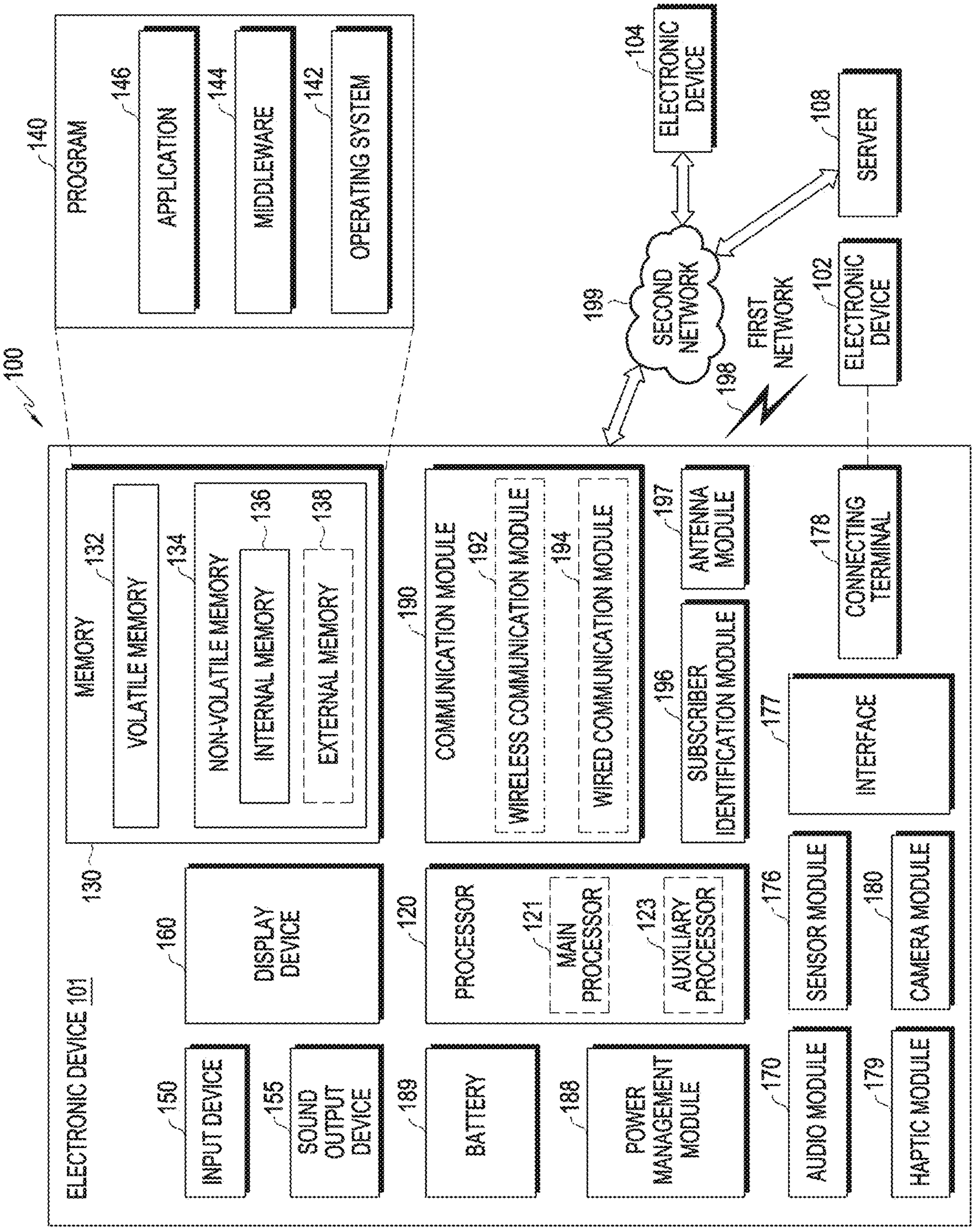
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
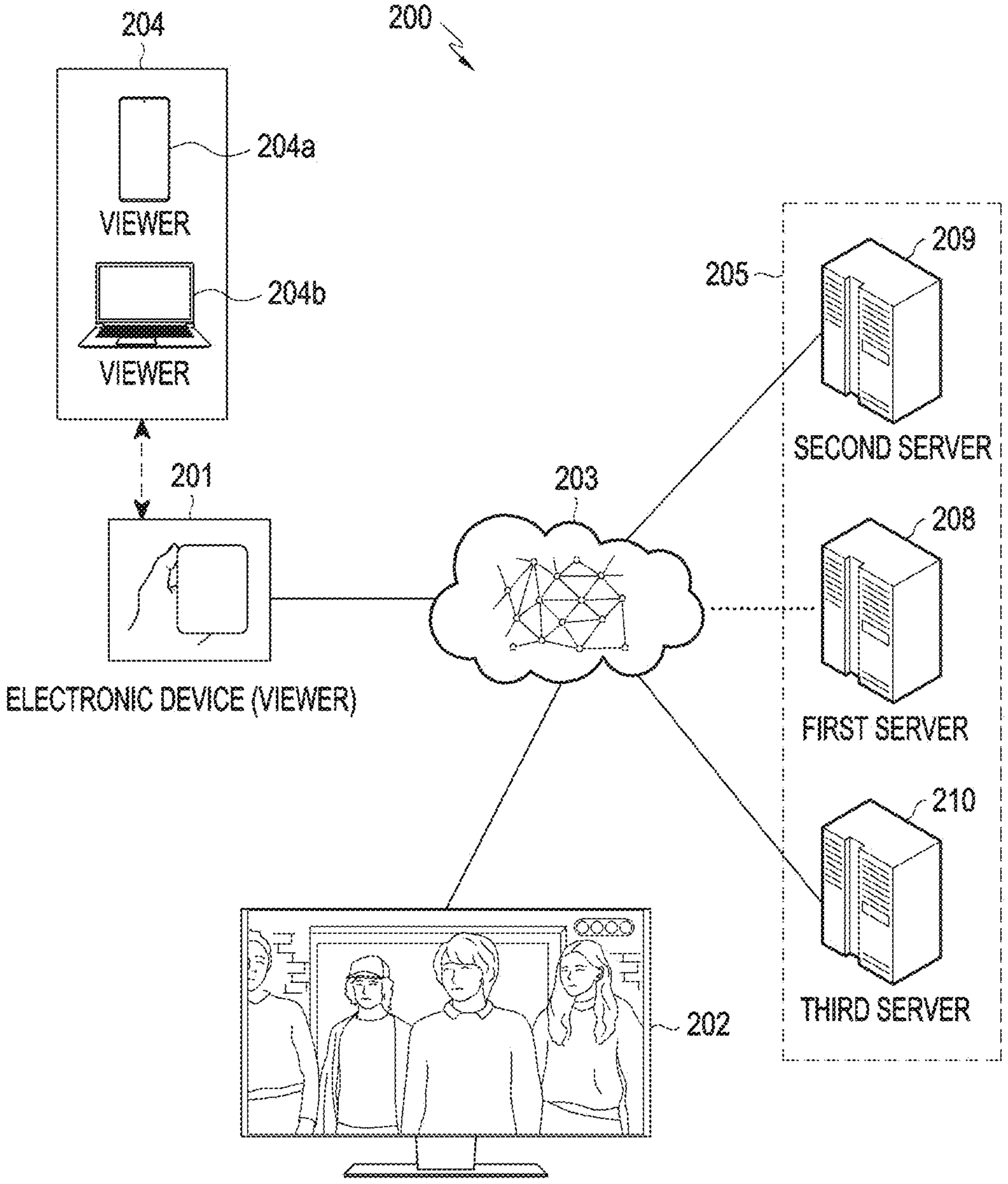
FIG. 2A is a view illustrating a system configuration for viewer-participable content provision according to various embodiments.
Figure 2B:
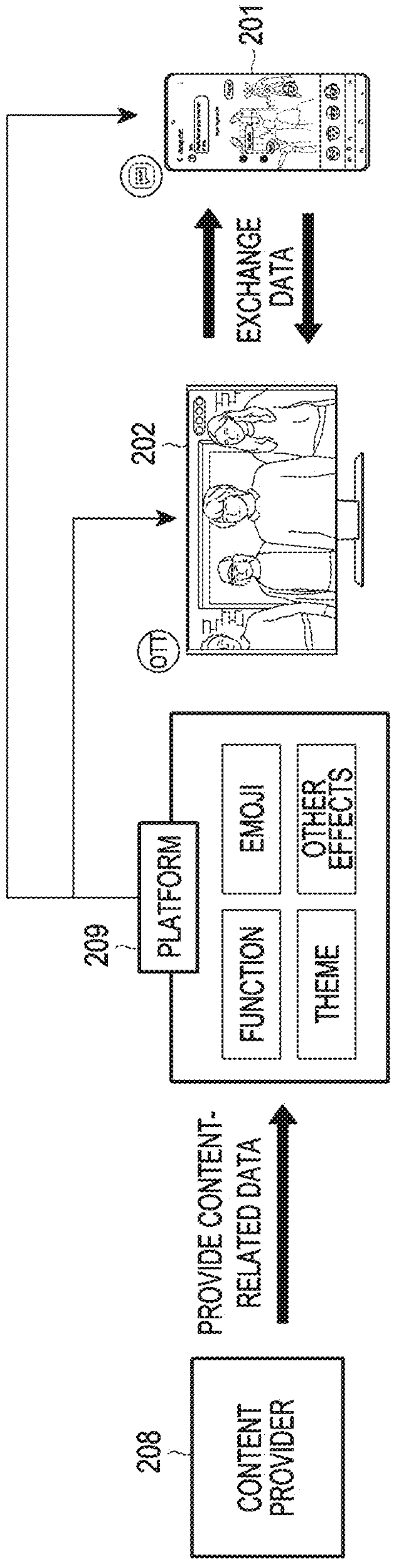
FIG. 2B is a view illustrating a bi-directional content-related data providing method according to various embodiments.

FIG. 2A is a view illustrating a system configuration for viewer-participable content provision according to various embodiments. FIG. 2B is a view illustrating a bi-directional content-related data providing method according to various embodiments. The following description is made with reference to FIG. 2B to aid understanding of the description of FIG. 2A.

Referring to FIG. 2A, a system 200 for viewer-participable content provision may include an electronic device 201, an external display device 202, an external electronic device 204, and at least one server 205 (e.g., a first server 208, a second server 209, and a third server 210). The electronic device 201 of FIG. 2A may include a component identical or similar to the electronic device 101 of FIG. 1, and each of the external display device 202 and the external electronic device 204 may include a component identical or similar to the electronic device 102 or the external electronic device 104 of FIG. 1.

According to various embodiments, the external display device 202 may provide content to the user. The content may include, e.g., web content provided through the Internet and multimedia content provided through a broadcasting network. According to an embodiment, the external display device 202 may download or receive, by streaming, content from at least one server 205 (e.g., a content provider) through the network 203.

According to various embodiments, the electronic device 201 may be connected to the external display device 202 to support a user-participable content service that allows a counterpart (e.g., the external electronic device 204) to log in and participate in a community service for content displayed on the external display device 202.

The user of the electronic device 201 may invite a counterpart to participate in connection with the content displayed on the external display device 202, and may execute an online community service corresponding to a space where they may gather and work. Here, the on-line community service (hereinafter, referred to as a community service) is a service in which the user of the electronic device 201 and the user of the external electronic device 204 participate in a text conversation format, and may be implemented in various forms such as, e.g., a messenger service such as a chat service, a message service, and a social network service (SNS). Text conversation may be performed, e.g., through a message application, and an application providing a community service may be referred to as a message application. Further, according to an embodiment, a community service associated with content may be referred to as 'watch together'. In an embodiment, the community service screen may refer to a chat window or a group chat window on a messenger service or social network service and may be referred to as an execution screen of a message application.

According to various embodiments, the electronic device 201 and the external electronic device 204 participating in the community service may perform a real-time chatting function for content reproduced through the external display device 202, and may receive, in real-time, data related to content (e.g., the type of content and the attribute of content) on the external display device 202. Each of the electronic device 201 and the external electronic device 204 may change, in real-time or dynamically, and display the whole or at least part of the community service screen, e.g., the execution screen of the message application, according to the data related to the content.

The external display device 202 may communicate with the electronic device 201 in a short-range communication scheme or, alternatively, may form a home network through an access device, such as an access point (AP), to communicate with the electronic device 201. According to an embodiment, the external display device 202 may correspond to a device having a larger screen than the electronic device 201 such as a TV or a computer, but is not limited thereto. Further, the external electronic device 204 may include a device capable of participating in a community service for content by forming a group together with the electronic device 201, such as a smartphone 204*a* or a computer 204*b*, but is not limited thereto.

The network 203 may be a data communication network, e.g., a private network or public network. For example, examples of the network 203 may include at least one of a private area network which covers a home, a local area network which covers a building, and a wide area network which covers a large city, a district, or a country border, or the Internet.

According to various embodiments, at least one server 205 may be the server 108 described above in connection with FIG. 1. According to various embodiments, the at least one server 205 may communicate with the user (or viewer)-side electronic device 201 and the external display device 202 through the network 203. The at least one server 205 may include a plurality of servers (e.g., the first server 208, the second server 209, and the third server 210). According to an embodiment, as illustrated in FIG. 2B, the first server 208 is a content provider that provides content, and the category, type, or attribute of the content provided by the first server 208 may differ.

According to an embodiment, the first server 208 is a server that provides content to be received by the user of the electronic device 201 and/or the external display device 202, and may require login in the content providing operation. Accordingly, the electronic device 201 and/or the external display device 202 may perform login using an ID and a password. For example, login may refer to an operation of identifying a personal account while accessing a website or application operated by the first server 208 using the external display device 202 and/or the electronic device 201.

When the electronic device 201 subscribes to be accessible to the website or application operated by the first server 208, but counterparts capable of participating in the community service for content by forming a group, e.g., the user of the external electronic device 204, is in a non-subscribed state or has different access authority from that of the electronic device 201, screen sharing authority may be given to invited counterparts according to the service subscription conditions of the electronic device 201 having access authority. For example, when a content service subscribing user invites non-subscribing counterparts, the first server 208 may provide viewer-participable content by forcing them to view advertisements for a predetermined time as a condition for viewing the content, or by preferentially granting the screen sharing authority to viewers who subscribe to the community service for the content.

According to an embodiment, the first server 208 may provide movie and broadcast content. The services provided by the first server 208 may include services in various fields, such as a content service. For example, the content service may refer to a service that provides images, videos, or music included in multimedia content, but the service type is not limited thereto. According to an embodiment, the first server 208 may correspond to at least one of a web content providing server, a broadcasting server, an over the top (OTT) server, a cloud server, or a streaming server.

According to an embodiment, the second server 209, as a platform server, may perform a function of transmitting content to the external display device 202 and may perform a function of providing content-related data to the external display 202, the electronic device 201, or the external electronic device 204 participating in a community service with the electronic device 201.

According to an embodiment, the second server 209 may be a platform server that serves to allow a service providing content to the external display device 202 and a community service related to the content on the electronic device 201 to interoperate with each other. The second server 209 may serve to enable integration of content viewing and the community service.

According to an embodiment, the third server 210 may be a server that provides a community service related to content between the electronic device 201 and the external electronic device 204. Here, the content may be content provided in real-time from the first server 208 to the external display device 202. For example, the third server 210 may be a server that provides a message application function that provides a community service, and may be in a state of being previously affiliated with the first server 208 to provide a community service related to content. For example, the content provider and the server of the message application may be mutually affiliated.

Referring to FIG. 2B, according to an embodiment, the first server 208 (e.g., a content provider) may share a source (e.g., content-related data) for a community service associated with content with the second server 209. For example, the second server 209 may serve to connect the content service and the community service to interoperate with each other and may provide a community service specified for content and manage data transmission/reception through the first server 208 providing content and the third server 210 providing the community service. Further, the second server 209 may identify the status of each of the electronic device 201 and the external electronic device 204 as well as the external display device 202 and provide a content-related community service corresponding thereto.

To that end, the second server 209 may analyze the content status on the external display device 202 based on the content-related data provided from the first server 208, and provide data (e.g., a content-related function, a theme, an emoji, and other effects) corresponding to the analysis result to the external display device 202 and the electronic device 201. Further, the second server 209 may interoperate with the third server 210 to provide data corresponding to the analysis result to the external electronic device 204 participating in the community service. Accordingly, the third server 210 may reflect (or apply) the data shared through the second server 209 to the community service screens on the electronic device 201 and the external electronic device 204, and thus each of the electronic device 201 and the external electronic device 204 may provide the community service interoperable with the content on the external display device 202 to the viewer. For example, the third server 210 may display a screen that changes in real-time by transmitting data for configuring a community service screen that changes according to content to each of the electronic device 201 and the external electronic device 204. As another example, each of the electronic device 201 and the external electronic device 204 may receive data shared through the second server 209 from the third server 210 and configure a content-based community service screen based thereon. As described above, data exchange between the electronic device 201 and the external display device 202 may be performed through interoperating between the servers 208, 209, and 210. For example, an input in the electronic device 201 may be reflected to the content displayed on the external display device 202, and a change in content in the external display device 202 may be reflected onto the community service screen on the electronic device 201.

Figure 3:
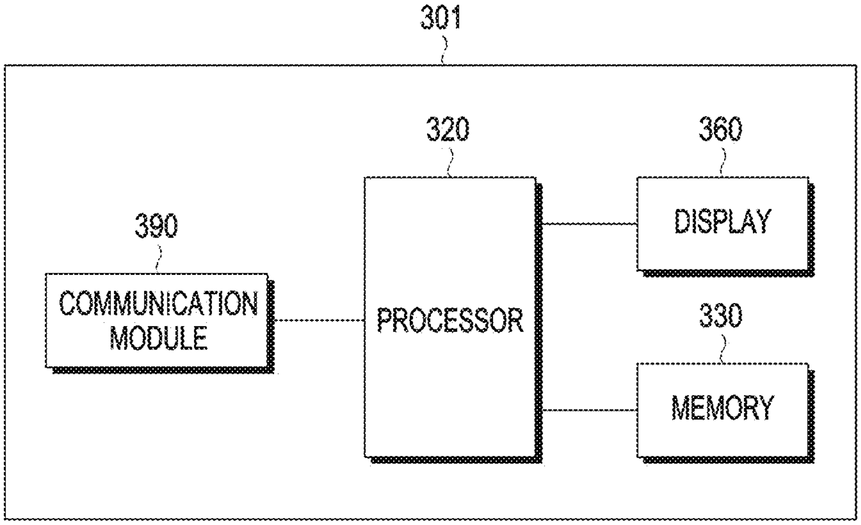
FIG. 3 is a block diagram illustrating an internal configuration of an electronic device according to various embodiments.

FIG. 3 is a block diagram illustrating an internal configuration of an electronic device according to various embodiments.

Referring to FIG. 3, an electronic device 301 may include at least one processor 320, memory 330, a display 360, and a communication module 390. The electronic device 301 of FIG. 3 may include components identical or similar to those of the electronic device 101 of FIG. 1

Further, the electronic device 301 of FIG. 3 may be the electronic device 201 of FIG. 2A. The electronic device 201 and the external electronic device 204 of FIG. 2A may simultaneously participate in (or access) a community service related to content, and each may provide the user (or viewer) with a community service screen that changes according to the content being viewed. Therefore, the following description focuses on the electronic device 301 of any one of the viewers simultaneously participating in the community service.

According to various embodiments, the memory 330 may be electrically connected to the processor 320 and store at least one application. For example, the at least one application may include a message application in which a plurality of viewers may participate in relation to the content displayed on the external display device.

According to various embodiments, the memory 330 may store information related to control of a community service screen (e.g., a message application screen) in response to content-related data in relation to the content displayed on the external display device. For example, at least one component of the community service screen that may be changed according to content-related data (e.g., content type and content attribute) may be mapped and stored. For example, items indicating functions that may be provided may vary according to content-related data (e.g., content type and content attribute). Further, at least one of a theme, an emoji, an emoticon, or a background image in the community service screen may be changed according to the content-related data.

According to various embodiments, the memory 330 may store a learning algorithm for providing a message application screen that changes in real-time in response to the content-related data.

According to various embodiments, the display 360 may simultaneously support input/output functions of data and may detect touches. According to an embodiment, the display 360 may include a touch sensor.

According to various embodiments, the display 360 may display a message application screen in which a plurality of viewers may participate in relation to the content displayed on the external display device. The message application screen may include a function that may be provided in relation to content, and at least a part or a component of the screen may vary depending on the content.

According to various embodiments, the communication module 390 may communicate with an external display device under the control of the processor 320. For example, the communication module 390 may be communicatively connected to an external display device through short-range communication such as Bluetooth or BLE.

According to various embodiments, when the processor 320 is connected to the external display device, the processor 320 may display a message application screen in which a plurality of viewers may participate in relation to the content displayed on the external display device.

According to an embodiment, the processor 320 may provide various functions related to content-related data using an algorithm model trained by an artificial intelligence (AI) algorithm. For example, the processor 320 may obtain meaningful information in a conversation with the counterpart while executing the message application. The operation based on the trained algorithm model may be performed in the electronic device 301, or may be performed through an external server (e.g., a message application server). In the former case, the processor 320 may obtain the conversation volume and the conversation content using the trained algorithm model while the plurality of viewers perform a conversation in relation to the content and, based thereupon, may reflect and display the same on the message application screen. In the latter case, the processor 320 may transmit the conversations with the plurality of viewers to an external server, obtain the conversation volume and the conversation content using the algorithm model trained in the external server, and obtain and display data related to the message application screen from the external server. According to an embodiment, the conversation volume may mean an amount of text data converted when a conversation for an entire conversation time or a conversation for a predetermined time is converted into text data. Alternatively, the conversation volume may mean the total conversation time.

According to various embodiments, an electronic device 301 may comprise a communication module 390, a display 360, memory 330, and at least one processor 320. The at memory storing instructions that, when executed by the at least one processor, cause the electronic device to establish a connection between an external display device (e.g., the external display device 202 of FIG. 2A) and the electronic device 301 through the communication module 390, execute a message application that allows participation of the electronic device 301 and at least one external electronic device (e.g., the external electronic device 204 of FIG. 2A), obtain data related to content displayed on the external display device 202 based on the connection between the external display device 202 and the electronic device 301, and display, on the display 360, an execution screen of the message application, which changes in response to the data related to the content.

According to various embodiments, the execution screen of the message application may be configured to change a first component of the execution screen to a second component in response to the data related to the content.

According to various embodiments, the first component and the second component may include at least one of a theme, an emoji, an emoticon, or a background image.

According to various embodiments, the instructions cause the electronic device to display an item indicating a function providable in relation to the content on the execution screen of the message application, based on the data related to the content.

According to various embodiments, the instructions cause the electronic device to identify a type of the content, based on the data related to the content, identify at least one function providable in response to the identified type of the content, and display an item indicating the identified function on at least a portion of the execution screen of the message application.

According to various embodiments, the instructions cause the electronic device to obtain at least one of a conversation volume or conversation content using a trained algorithm model while displaying the execution screen of the message application and display the execution screen of the message application changing based on the obtained at least one of the conversation volume or the conversation content.

According to various embodiments, the instructions cause the electronic device to obtain an image captured for a scene of content displayed on the external display device and display the execution screen of the message application reflecting the captured image.

According to various embodiments, the instructions cause the electronic device to, when the conversation volume is equal to or greater than a threshold, display the captured image as a background of the execution screen of the message application.

According to various embodiments, the instructions cause the electronic device to associate the conversation content with the captured image and display the associated conversation content and captured image on the execution screen of the message application, based on the conversation content.

According to various embodiments, the instructions cause the electronic device to arrange emojis according to priorities of the emojis on the execution screen, based on a result of recognizing content displayed on the external display device.

According to various embodiments, a computer program product may include a storage medium storing instructions when executed by at least one processor of an electronic device, cause the electronic device to perform a plurality of operations that include establishing a connection between an external display device and the electronic device, executing a message application that allows participation of the electronic device and at least one external electronic device, obtaining data related to content displayed on the external display device based on the connection between the external display device and the electronic device, and displaying an execution screen of the message application changing in response to the data related to the content.

Figure 4:
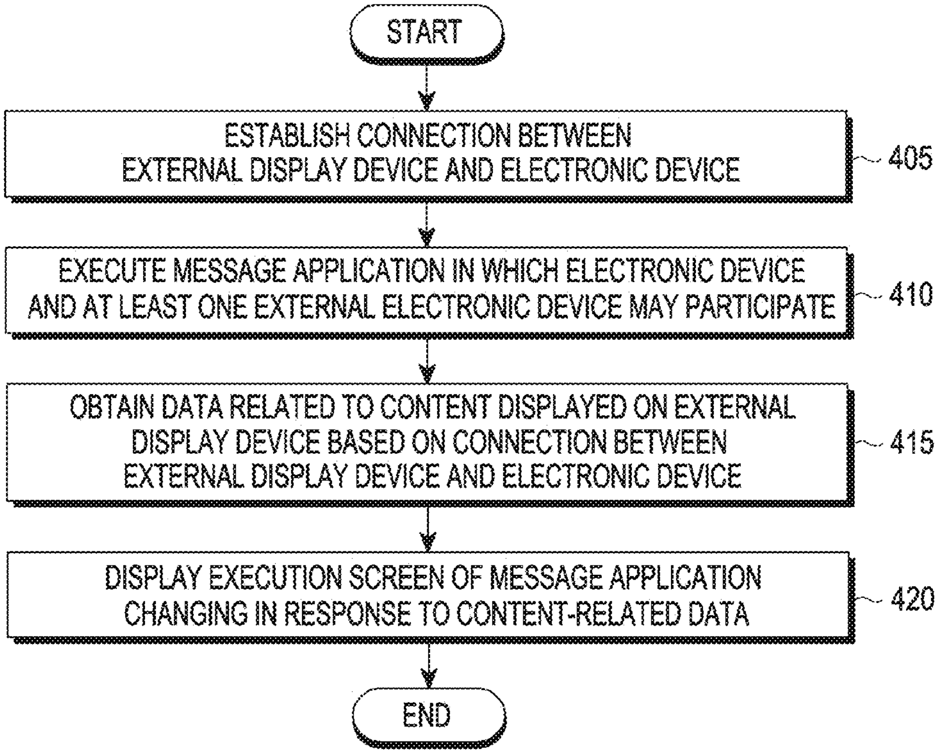
FIG. 4 is a flowchart illustrating operations of an electronic device for viewer-participable content provision according to various embodiments.

FIG. 4 is a flowchart illustrating operations of an electronic device for viewer-participable content provision according to various embodiments.

Referring to FIG. 4, the operation method may include operations 405 to 420. Each step/operation of the operation method of FIG. 4 may be performed by an electronic device (e.g., the electronic device 101 of FIG. 1, the electronic device 201 of FIGS. 2A and 2B, or the electronic device 301 of FIG. 3) or at least one processor (e.g., at least one of the processor 120 of FIG. 1 or the processor 320 of FIG. 3) of the electronic device.

In operation 405, the electronic device 301 may establish a connection between the electronic device 301 and an external display device (e.g., the external display device 202 of FIG. 2A). According to an embodiment, the electronic device 301 may discover peripheral devices and may establish communication with the discovered external display device. For example, the electronic device 301 may be connected to an external display device based on a short-range communication scheme.

In operation 410, the electronic device 301 may execute a message application that allows participation of the electronic device 301 and at least one external electronic device (e.g., the external electronic device 204 of FIG. 2A). According to an embodiment, the electronic device 301 may execute the message application to invite a counterpart to communicate in relation to the content displayed on the external display device, i.e., at least one external electronic device, and then display an execution screen of the message application indicating the participation group.

In operation 415, the electronic device 301 may obtain data related to content displayed on the external display device, based on the connection between the external display device and the electronic device 301. According to an embodiment, the electronic device 301 may obtain data related to content (or content currently being reproduced) displayed on the external display device and may utilize the data for various functions on the user interface (UI) (or execution screen) of the message application. In an embodiment, when the electronic device 301 is connected to the external display device, the electronic device 301 may receive data related to the content from the external display device. For example, the electronic device 301 may receive data related to content from a server (e.g., the first server 208 and/or the second server 209) connected to the external display device.

In operation 420, the electronic device 301 may display the execution screen of the message application that changes in response to data related to content.

According to an embodiment, the electronic device 301 may control at least a portion of the execution screen or a component of the execution screen to be changed in response to the data related to the content. According to an embodiment, the execution screen of the message application may be configured to change a first component of the execution screen to a second component in response to the data related to the content.

According to an embodiment, the electronic device 301 may control to change a first component of the execution screen to a second component in response to the data related to the content. Here, the first component and the second component may include at least one of a theme, an emoji, an emoticon, or a background image. In addition to what is described above, the electronic device 301 may variously change and display the execution screen. For example, the electronic device 301 may control to display, on the execution screen, items (or functions) controllable in relation to the content displayed on the external display device or to change the visual effect of the graphic object displayed on the execution screen according to the data related to the content.

According to various embodiments, displaying the execution screen of the message application may include displaying an item indicating a function providable in relation to the content on the execution screen of the message application, based on the data related to the content.

According to various embodiments, displaying the item indicating the function providable in relation to the content may include identifying a type of the content, based on the data related to the content, identifying at least one function providable in response to the identified type of the content, and displaying an item indicating the identified function on at least a portion of the execution screen of the message application.

According to various embodiments, the method may further comprise obtaining at least one of a conversation volume or conversation content using a trained algorithm model while displaying the execution screen of the message application and displaying the execution screen of the message application changing based on the obtained at least one of the conversation volume or the conversation content.

According to various embodiments, the method may further comprise obtaining an image captured for a scene of content displayed on the external display device and displaying the execution screen of the message application reflecting the captured image.

According to various embodiments, displaying the execution screen of the message application reflecting the captured image may include, when the conversation volume is a designated number of times or more, displaying the captured image as a background of the execution screen of the message application.

According to various embodiments, displaying the execution screen of the message application reflecting the captured image may include associating the conversation content with the captured image and displaying the associated conversation content and captured image on the execution screen of the message application, based on the conversation content.

According to various embodiments, the method may further comprise sorting and then arranging emojis in priority on the execution screen, based on a result of recognizing content displayed on the external display device.

Figure 5:
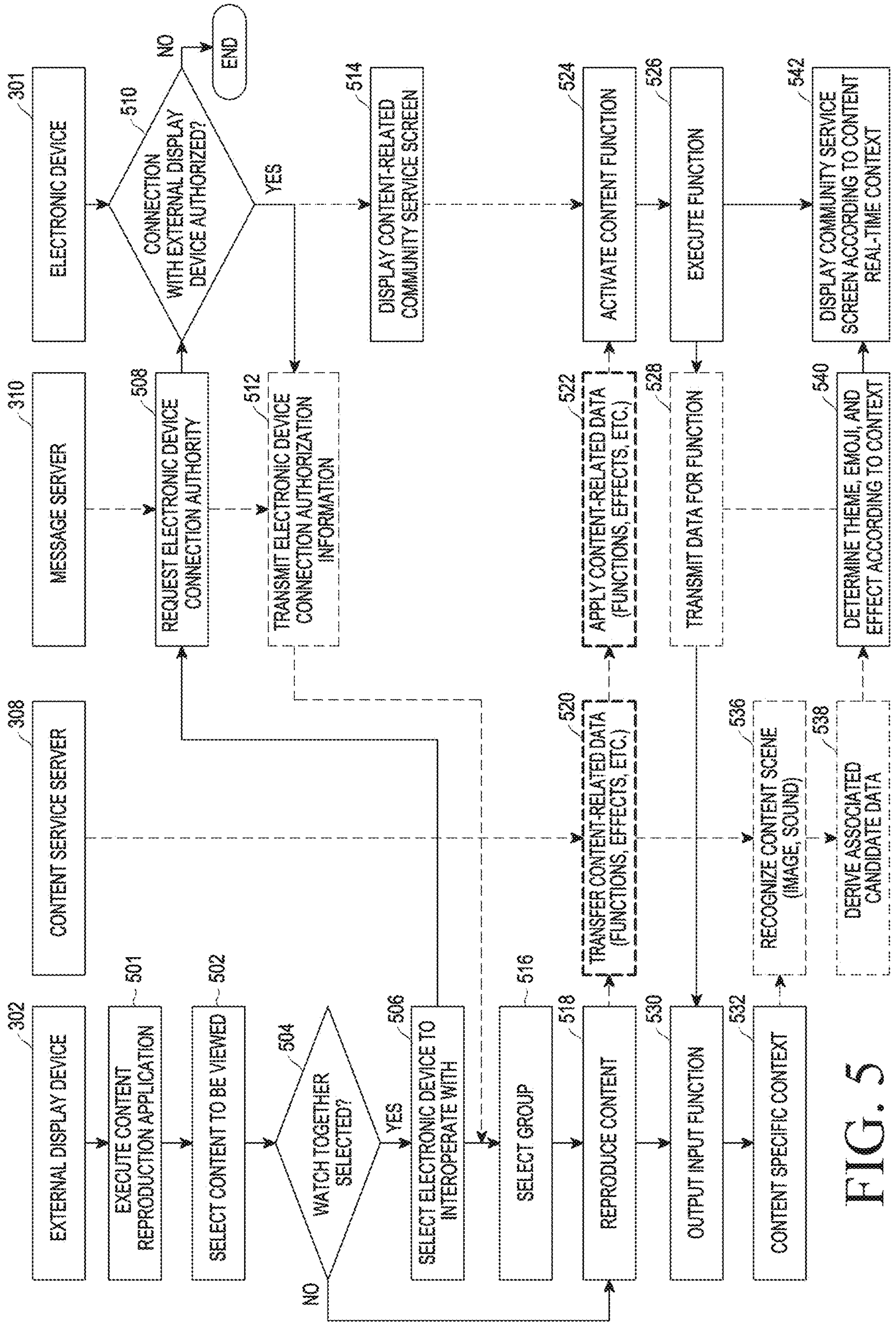
FIG. 5 is a view illustrating signal flows between components for providing a content service associated with a community service according to an embodiment.

FIG. 5 is a view illustrating signal flows between components for providing a content service associated with a community service according to an embodiment.

Referring to FIG. 5, the external display device 302 may be connected to a content service server 308 (e.g., the first server 208 of FIG. 2A), and the electronic device 301 may be connected to a message server 310 (e.g., the third server 210 of FIG. 2A) to provide viewer-participable content through interoperation between the content service server 308 and the message server 310.

In operation 501, the external display device 302 may execute a content reproduction application, and in operation 502, the external display device 302 may select content to view according to a user input. For example, after accessing a website providing content or executing a content reproduction application, the external display device 302 may select desired content according to user selection. In operation 504, the external display device 302 may identify whether a selection for a community service (e.g., a 'watch together' function) associated with the content is input. If the 'watch together' function is not selected, the external display device 302 may perform general operations of receiving the selected content from the content service server 308 and reproducing the content.

On the other hand, when the 'watch together' function is selected, the external display device 302 may select an electronic device to interoperate with in operation 506. For example, since the viewer viewing the content on the external display device 302 is also the user of the electronic device 301, the operation of connecting the external display device 302 and the electronic device 301 to each other may be performed to be able to provide a content-associated community service. In response to selecting the electronic device to interoperate with, the external display device 302 may request connection to the electronic device 301. In this case, the request for authority to connect to the electronic device 301 may be directly transferred from the external display device 302 to the electronic device 301 or may be transferred to the electronic device 301 through the message server 310 interoperating with the content service server 308. Here, the signal and/or data transferred from the content service server 308 to the electronic device 301 may be transferred to the electronic device 301 through the platform server (e.g., the second server 209 of FIG. 2A) and the message server 310, and although the platform server is omitted in FIG. 5, it should be understood that the interoperation between the content service server 308 and the message server 310 is performed through the platform server.

In response to a connection authority request for the electronic device 301, the electronic device 301 may determine whether to approve the connection with the external display device 302 in operation 510. In response to a user input for approving the connection, the electronic device 301 may transfer connection approval information directly or through the message server 310 to the external display device 302 in operation 512. Further, in response to the connection approval, the electronic device 301 may display a content-related community service screen in operation 514. For example, the electronic device 301 may display an execution screen of a viewer-participable message application.

Meanwhile, the external display device 302 may designate a target to participate in the community service in response to reception of the connection approval information, and may select a desired group in operation 516. In operation 518, the external display device 302 may reproduce the selected content, and in the state in which the 'watch together' function is activated, the content service server 308 may transfer content-related data (e.g., a theme, an emoji, an emoticon, a background image, a function, an effect, etc.) to the message server 310 in operation 520. In operation 522, the message server 310 may apply content-related data to the community service screen, and in response thereto, the electronic device 301 may activate and display a content function on the community service screen in operation 524.

Figure 6:
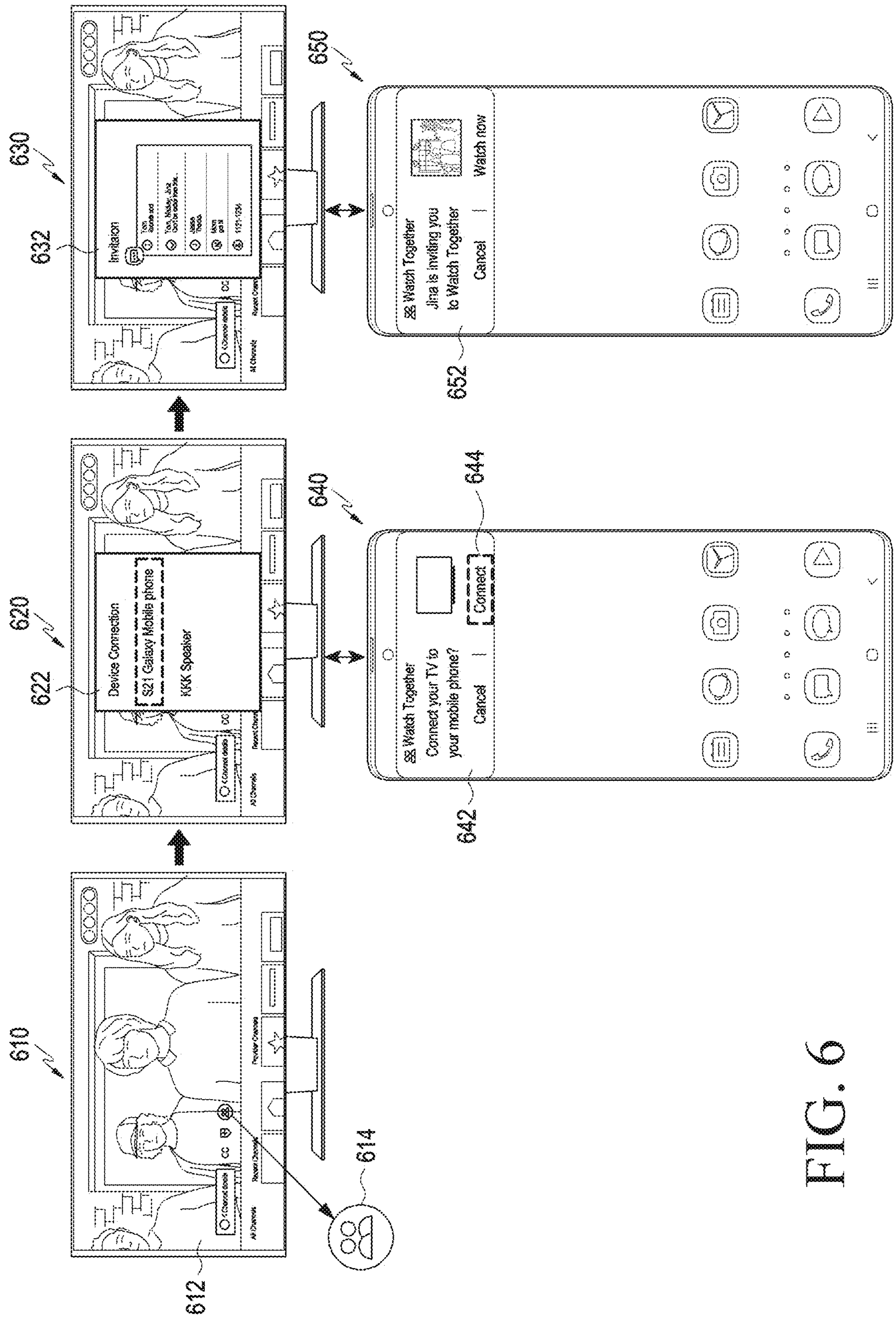
FIG. 6 is a view illustrating an example of each screen when an external display device and an electronic device start to interoperate according to various embodiments.
Figure 7:
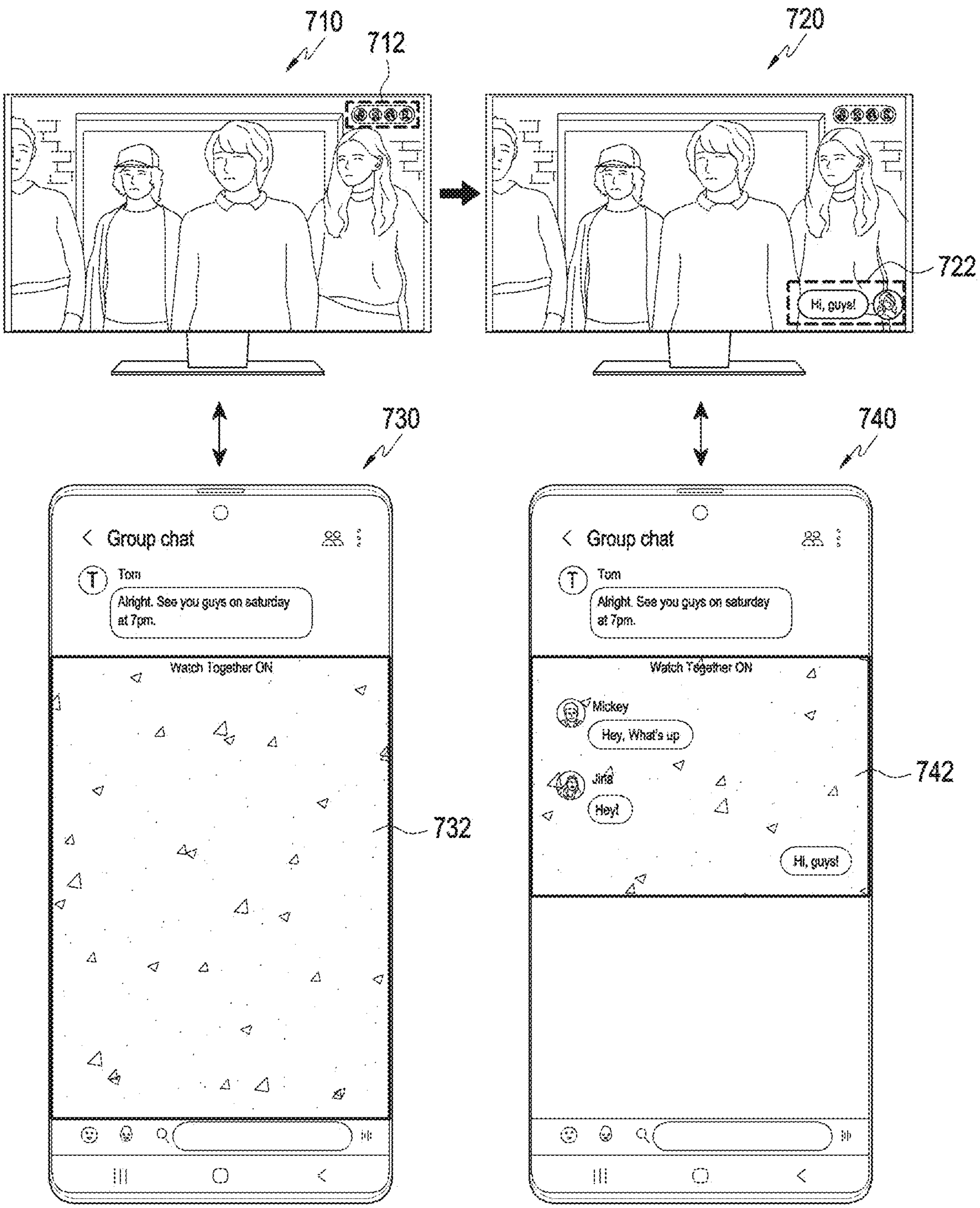
FIG. 7 is a view illustrating an example of each screen when interoperation between an external display device and an electronic device is completed according to various embodiments.

This is described below in detail with reference to FIGS. 6 and 7. FIG. 6 is a view illustrating an example of each screen when an external display device and an electronic device start to interoperate according to various embodiments. FIG. 7 is a view illustrating an example of each screen when interoperation between an external display device and an electronic device is completed according to various embodiments.

Referring to FIG. 6, as shown in reference numeral 610, when the watch together button 614 is selected in response to the user input on the screen 612 where content to be viewed or content being viewed is displayed on the external display device 302, as shown in reference numeral 620, a selection window 622 for selecting an electronic device to be connected to the external display device 302 may be displayed. When any one electronic device is selected through the selection window 622, as indicated by reference numeral 640, a notification window 642 indicating that there is a connection request from the external display device 302 may be displayed on the screen of the electronic device corresponding to the selection.

When a connection item 644 according to a user input is selected in the notification window 642, as indicated by reference numeral 630, an invitation window 632 for selecting members to be invited to a group room together with the connected electronic device 301 may be displayed on the external display device 302. In response to the selection through the invitation window 632, as indicated by reference numeral 650, a content 652 indicating that the invitation is being made may be displayed on the electronic device 301, and a content requesting an invitation may be displayed on the devices of the invited members, e.g., the external electronic device 204.

Meanwhile, referring to FIG. 7, after the invitation to the group room is completed, as illustrated in reference numeral 710, an item 712 indicating that the watch together function is being executed may be displayed on the content reproduction screen of the external display device 302. For example, objects indicating members participating in the group room may be displayed. Further, as indicated by reference numeral 720, the conversation content 722 may be displayed on at least a portion of the content reproduction screen of the external display device 302. Here, the conversation content 722 may be the conversation content in the chat room in the electronic device 301.

Further, as indicated by reference numeral 730, the electronic device 301 may display an execution screen 732 of a message application indicating that the watch together function has been executed. As indicated by reference numeral 740, the user of the electronic device 301 may view the content in real-time and while simultaneously chatting with the group members in relation to the content through the chat window 742.

Figure 8A:
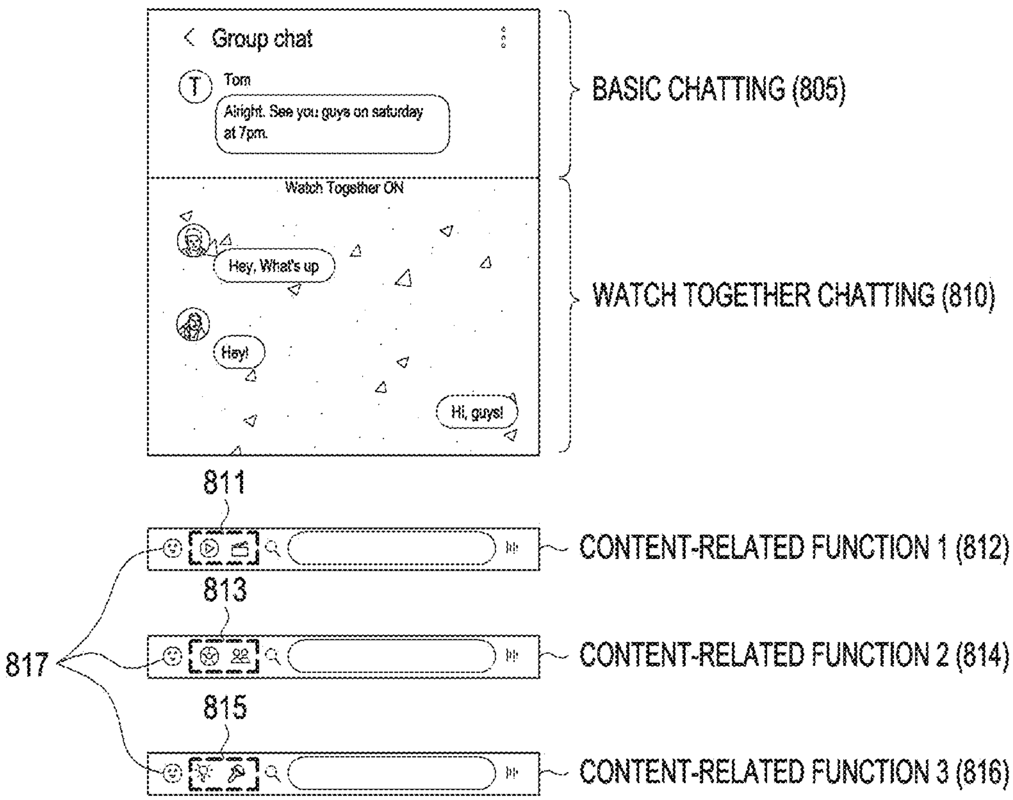
FIG. 8A is a view illustrating an example screen showing a configuration of a community service screen when interoperating with a community service according to various embodiments.

Meanwhile, the execution screen 732 of the message application indicating that the watch together function has been executed is described with reference to FIGS. 8A and 8B. FIG. 8A is a view illustrating an example screen showing a configuration of a community service screen when interoperating with a community service according to various embodiments. FIG. 8B is a view illustrating a mapping table of community service functions providable according to content types according to various embodiments.

As illustrated in FIG. 8A, the execution screen of the message application may be largely divided into before and after activation of the watch together function. For example, in the inactive state of the watch together function, a default chat window 805 may be displayed, but in the active state of the watch together function, a watch together chat window 810 in which text indicates being in the watch together chatting state, and the background image, background color, or theme has been changed may be displayed to indicate a state of being switched into the watch together mode.

According to an embodiment, when the watch together function is activated, the electronic device 301 may obtain data related to content displayed on the external display device 302, and may display an item indicating a function that may be provided in relation to the content. Specifically, when the watch together function is activated, the electronic device 301 may identify at least one function that may be provided corresponding to the type of content, and display an item indicating the identified function on at least a portion of the screen.

As illustrated in FIG. 8A, in the case of content of a first type, the electronic device 301 may provide content-related function 1 812 to at least a portion of the screen, in the case of content of a second type, the electronic device 301 may provide content-related function 2 814, and in the case of content of a third type, the electronic device 301 may provide content-related function 3 816. The corresponding content-related function according to the type of each content may be displayed using graphic objects 811, 813, and 815 such as emoticons. Further, the electronic device 301 may provide an emoji 817 related to the content as a common function in addition to a function that may be provided related to the content.

Referring to FIG. 8B, a type of content may be divided into drama/movie 820, sports 830, and concert 840, and an emoji/effect function 825 may be provided as a common function regardless of the type of content. For example, a specified emoji may be provided according to each content. Such an emoji may be provided from the content service server 308 or may be determined and provided from among emojis in the electronic device 301.

As illustrated in FIG. 8B, in the case of content such as drama/movie 820, a function 821 for controlling content viewing and a function 822 for identifying basic information may be provided. In the case of content such as sports 830, a game highlight replay function 831 and a function 832 for identifying information, such as team, player information, or formation, may be provided. In the case of content such as concert 840, a cheering rod function 841 and a karaoke function 842 may be provided. As described above, the content functions that may be provided may vary according to the type of content, and the content functions that may be provided may be differently configured and displayed according to the identification of the type of content. In other words, a different content function may be provided for each content type.

In the state in which the content function is activated on the community service screen (or the execution screen of the message application), if any one function is executed by a user input in operation 526, the electronic device 301 may transmit data for the function input through the message server 310 to the external display device 302 in operation 528. Based on the data for the input function, in operation 530, the external display device 302 may output the input function on the content reproduction screen. Thereafter, the content-specific context in the external display device 302 in operation 532 may be transferred to the content service server 308. The content service server 308 may recognize the corresponding content scene in operation 536 and may derive candidate data associated with the corresponding content scene based on the recognition result and transfer the candidate data to the message server 310 in operation 538.

This is described in detail with reference to FIG. 8C. FIG. 8C is a view illustrating a mapping table of effects providable in a community service according to content types according to various embodiments.

As illustrated in FIG. 8C, content-related data may vary depending on the type of content, and at least one of a theme 850, an emoji 860, or an effect 870 may be reflected on the community service screen according to the type of content. The theme 850 (e.g., chat window background) may be divided into a content image 852, a metaphor 854, or a mood 856. The emoji 860 may be divided into a content 862 or a mood 864. The effect 870 (e.g., TV screen layered effect) may be divided into a common 872 and a mood 874. For example, in the case of content such as a TV show/movie, a main poster, a season/episode main image, or a title image may be provided as the background of the chat window, or a background color/tone to be applied to the background of the chat window may be provided. In the case of emojis, TV show character images may be provided or emojis may be arranged and provided in order of priority according to the real-time content context. On the other hand, since the effect 870 may interfere with watching a drama/movie, the effect 870 may not be provided so as not to be applied to the chat window. Further, in the case of content such as sports, an image such as a game title, a team emblem image, and a poster of players, may be provided as the background of the chat window or a metaphor indicating a game event may be provided. Further, in the case of the effect 870, basic effects such as firecrackers and cheering may be commonly provided, and effects may be arranged and provided in order of priority according to the real-time game context. Further, in the case of content such as a concert, a concert poster may be provided as the background of the chat window, and in the case of an emoji, a singer character emoji may be provided. On the other hand, the effect 870 may interfere with concert viewing, and thus may not be provided.

In operation 540, the message server 310 may determine a theme, an emoji, and an effect suitable for the content context, and in operation 542, the electronic device 301 may display a community service screen suitable for the content real-time context. For example, when the emoji function is executed in the electronic device 301, emojis may be arranged and displayed in order of priority according to the content context. Since the emoji represents emotion by combining the emoticon and the image, the electronic device 301 may display a related emoji according to the atmosphere (e.g., character expression, sound effect, or BGM data) in the content based on a result of recognizing the content.

Figure 9:
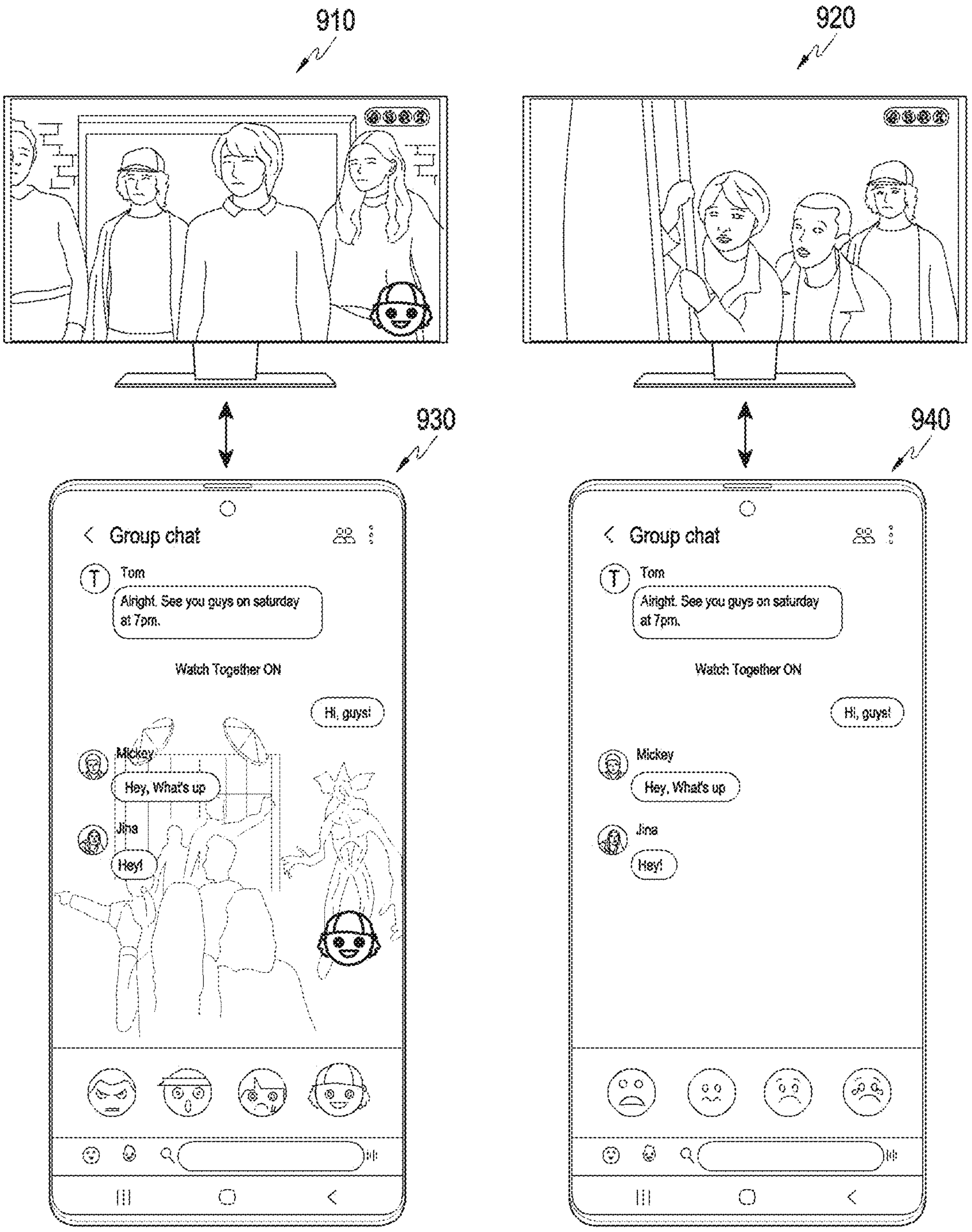
FIG. 9 is a view illustrating an example community service screen according to a real-time content analysis result according to various embodiments.

Referring to FIG. 9, as indicated by reference numeral 910, a related emoji may be displayed on the content reproduction screen, based on a result of analyzing characters in the content displayed on the external display device 302. Further, the electronic device 301 may sort and then arrange the emojis in order of priority on at least a portion of the execution screen of the message application based on the recognition result of the content displayed on the external display device 302.

According to an embodiment, after detecting the face of the character in the content, the facial expression of the character may be analyzed for emotion using a face landmarks detection technique based on a face image analysis database. Simultaneously with emotion analysis through face detection, a sound such as BGM may be analyzed for mood using a sound analysis database or metadata in BGM data. This analysis operation may be performed by the content service server 308, but may also be performed by the external display device 302. Through this analysis, data (e.g., happiness/enjoyment, sadness, fear/surprise) indicating the matched emotion may be transferred to the message server 310, and the message server 310 may sort the emojis in possession, in order of priority, based on the received data and provide them to the electronic device 301. Accordingly, the electronic device 301 may display emojis sorted in order of priority, and may increase the user's selectability by sorting the emojis in order of priority. The emoji selected by the user may be displayed in the chat room of the electronic device 301 as indicated by reference numeral 930, and may be reflected and displayed on the content reproduction screen on the external display device 302 as indicated by reference numeral 910. Further, as indicated by reference numeral 920, as the content is reproduced in real-time on the external display device 302, the content context may change in real-time. When the result of recognizing the content context is shared with the electronic device 301, the emojis may be re-sorted in order of priority and arranged on at least a portion of the execution screen of the message application of the electronic device 301, as indicated by reference numeral 940.

For example, since emojis related to a fun scene may include emojis representing happiness and enjoyment, emojis representing happiness and enjoyment may be sorted in higher priorities than those of other emojis. Accordingly, since emojis are sorted in order of priority and arranged on the community service screen according to order of priority in relation to the convent being currently viewed, such emojis may be highly likely to be selected by the viewer.

Meanwhile, in FIG. 5, a case in which the external display device 302 starts a content-based community service is described as an example, but the above-described method may also be applied where the external display device 302 starts a content-based community service. For example, after executing the message application, the electronic device 301 may designate a counterpart to participate in the content-based community service, and start interoperation with the external display device 302, so that the electronic device 301 may display a community service screen that changes in real-time according to the content on the external display device 302.

Figure 10:
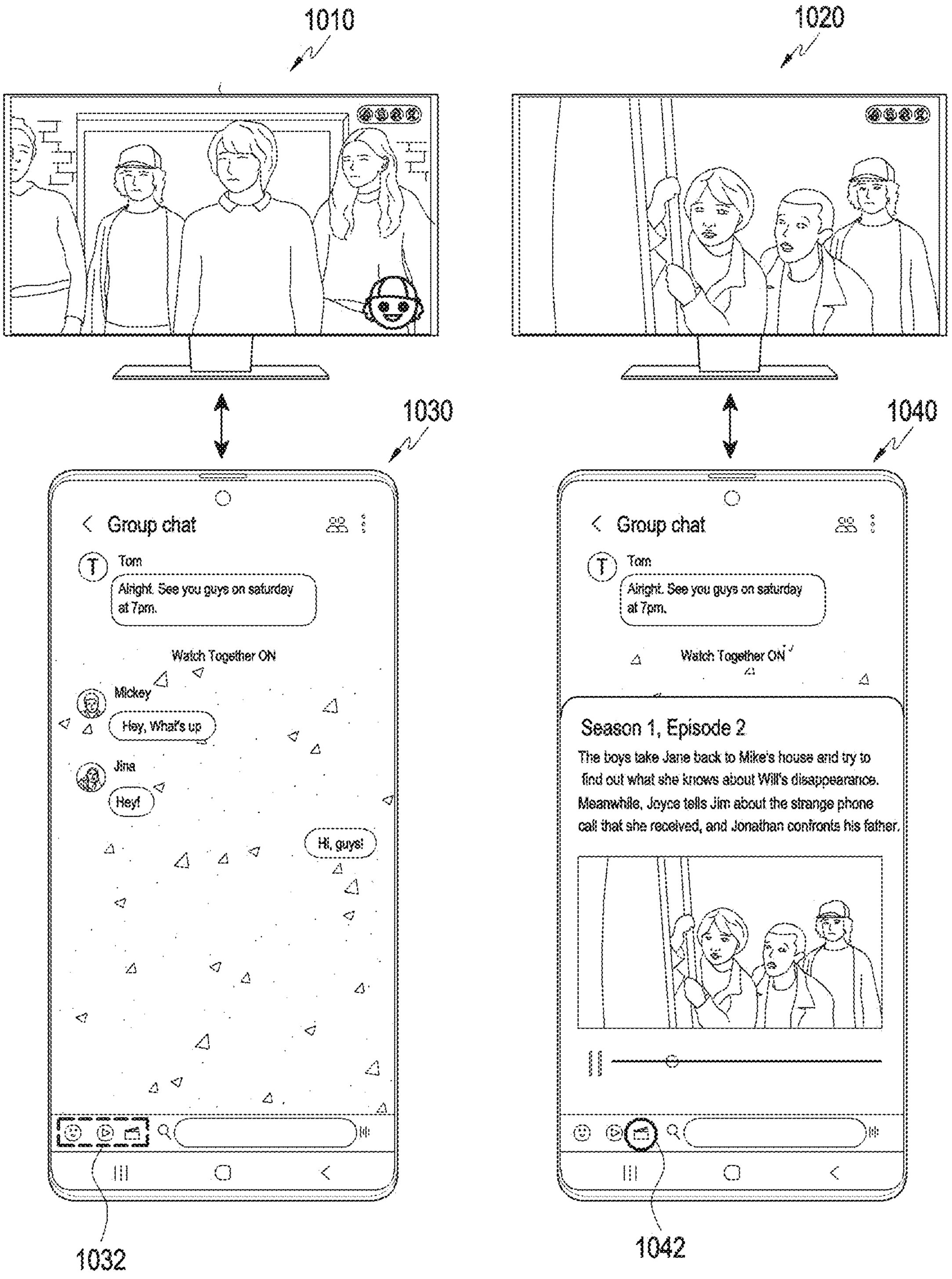
FIG. 10 is a view illustrating an example screen for describing a method for controlling content viewing on a community service screen according to various embodiments.

FIG. 10 is a view illustrating an example screen for describing a method for controlling content viewing on a community service screen according to various embodiments.

Referring to FIG. 10, as indicated by reference numeral 1010, items 1032 indicating functions providable in relation to content may be activated and displayed on the electronic device 301 according to the type of content being reproduced on the external display device 302. For example, when the content being reproduced is a drama/movie, as indicated by reference numeral 1030, functions (e.g., 821 and 822 of FIG. 8B) that may be provided in relation to the drama/movie may be provided through at least a portion of the chat room of the electronic device 301. Further, in the case of a drama/movie provided through an OTT service, the electronic device 301 may control content viewing in real-time through a function 1042 provided in the chat room as indicated by reference numeral 1020. Accordingly, as indicated by reference numeral 1040, content synchronized with the content being viewed through the external display device 302 may be displayed on the electronic device 301, and the content may be controlled.

Figure 11:
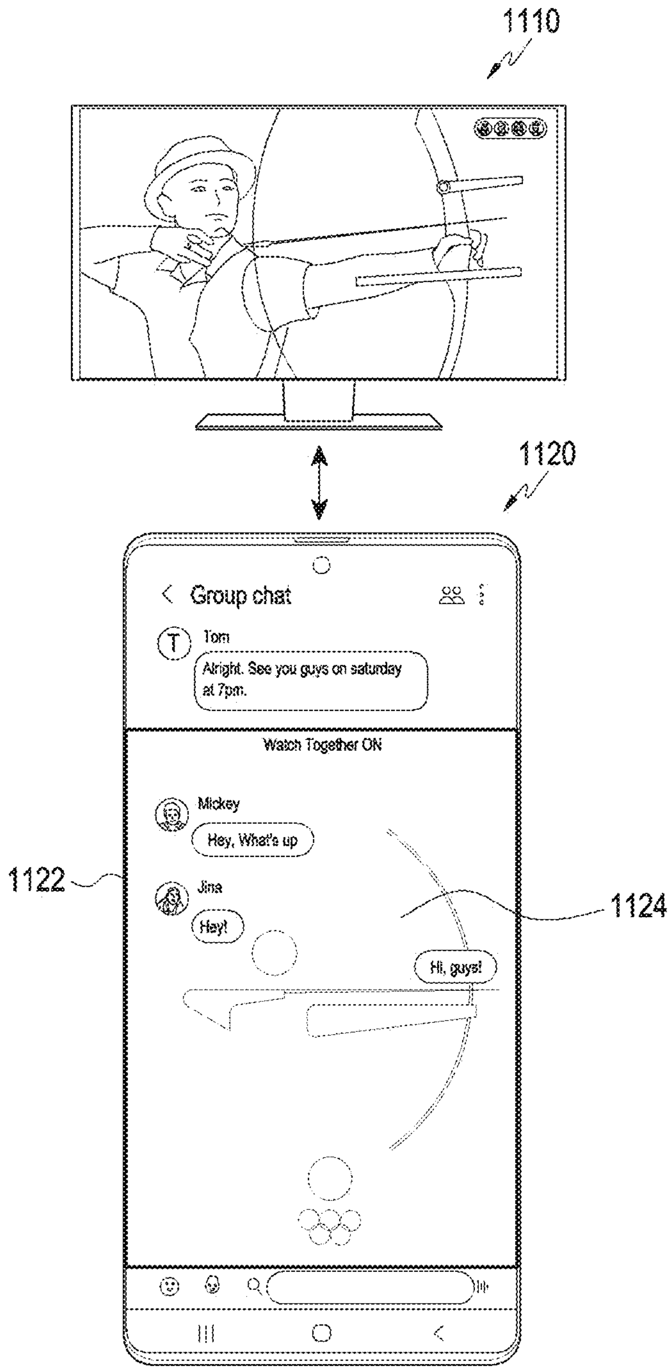
FIG. 11 is a view illustrating an example community service screen based on a content type according to an embodiment.

FIG. 11 is a view illustrating an example community service screen based on a content type according to an embodiment.

Referring to FIG. 11, as indicated by reference numeral 1110, when the type of content displayed on the external display device 302 is sports, as indicated by reference numeral 1120, the electronic device 301 may display a screen 1122 in which at least one component 1124 is changed to correspond to the sports content. For example, in the case of sports content, it is possible to analyze that the content is sports through metadata in the content, and a metaphor may be extracted by recognizing a pictogram (or an event icon) and a specific object (e.g., a bow or a target in the case of archery) in the content reproduction screen. The analysis operation and the metaphor extraction operation may be performed by the external display device 302 or the content service server 308. Accordingly, a component (e.g., an image) applied to the background of the chat window according to the extracted metaphor information may be transferred to the electronic device 301 via the message server 310.

Figure 12:
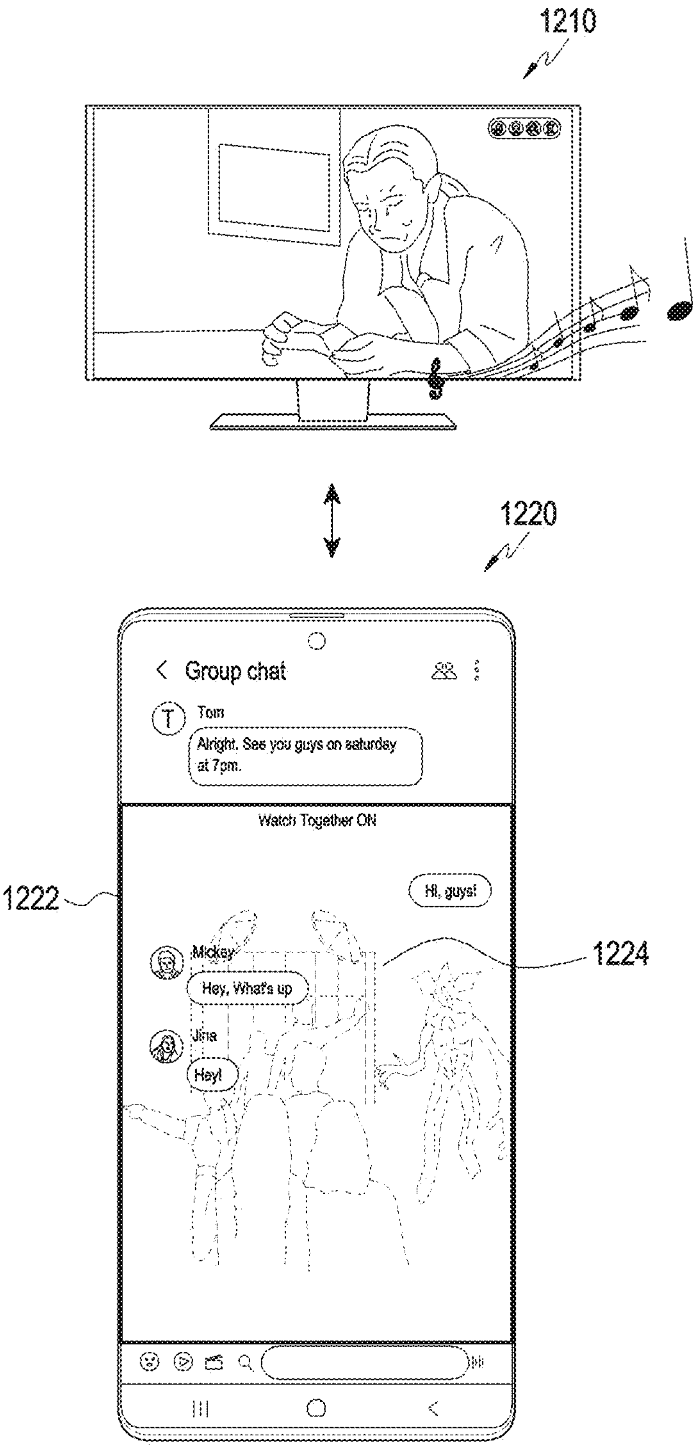
FIG. 12 is a view illustrating an example community service screen based on a content type according to another embodiment.

FIG. 12 is a view illustrating an example community service screen based on a content type according to another embodiment.

Referring to FIG. 12, as indicated by reference numeral 1210, when the type of content displayed on the external display device 302 is drama/movie content, the mood 1224 in the chat room 1222 on the electronic device 301 may be changed, as indicated by reference numeral 1220, based on the result of analyzing the sound and the BGM data of the content. For example, the mood of the chat room 1222 changes according to the atmosphere of the sound and the BGM data of the content, and in the case of a sad scene, a tone-down background may be displayed.

Figure 13:
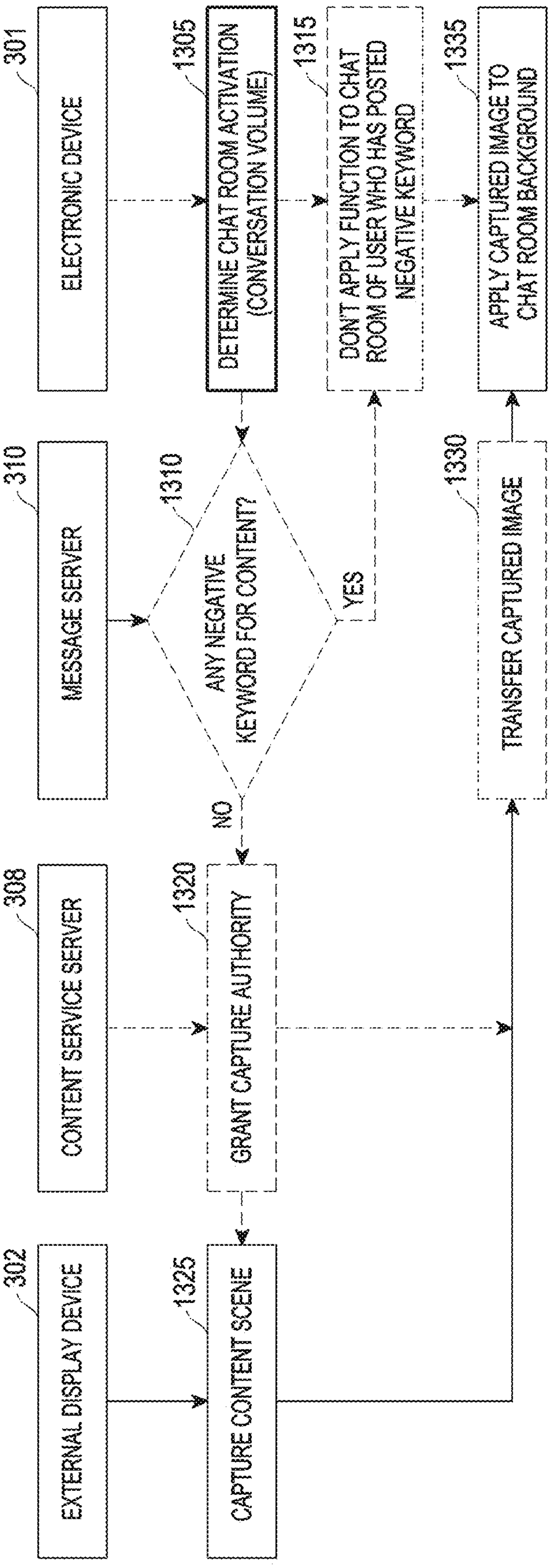
FIG. 13 is a view illustrating a method for obtaining content of an external display device according to various embodiments.
Figure 14:
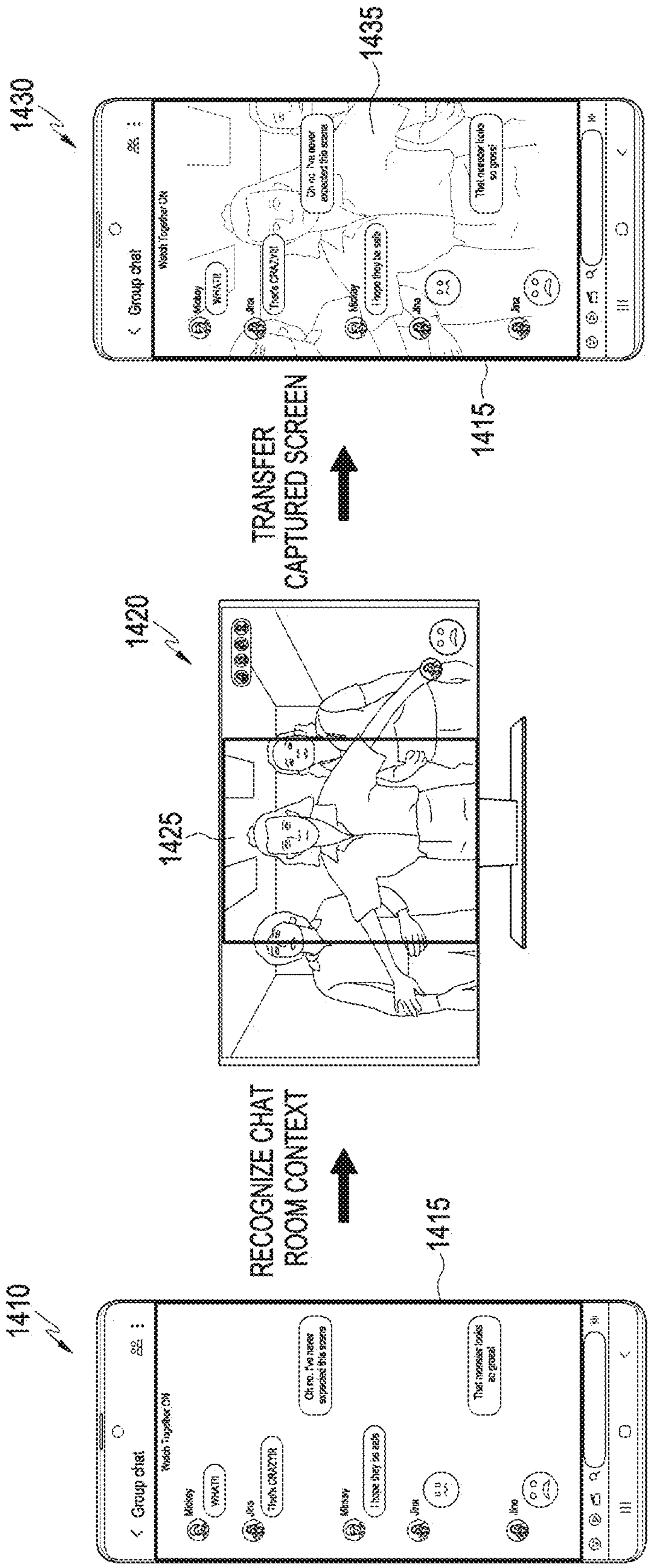
FIG. 14 is a view illustrating an example community service screen that changes in response to the degree of community service participation activation according to various embodiments.
Figure 15:
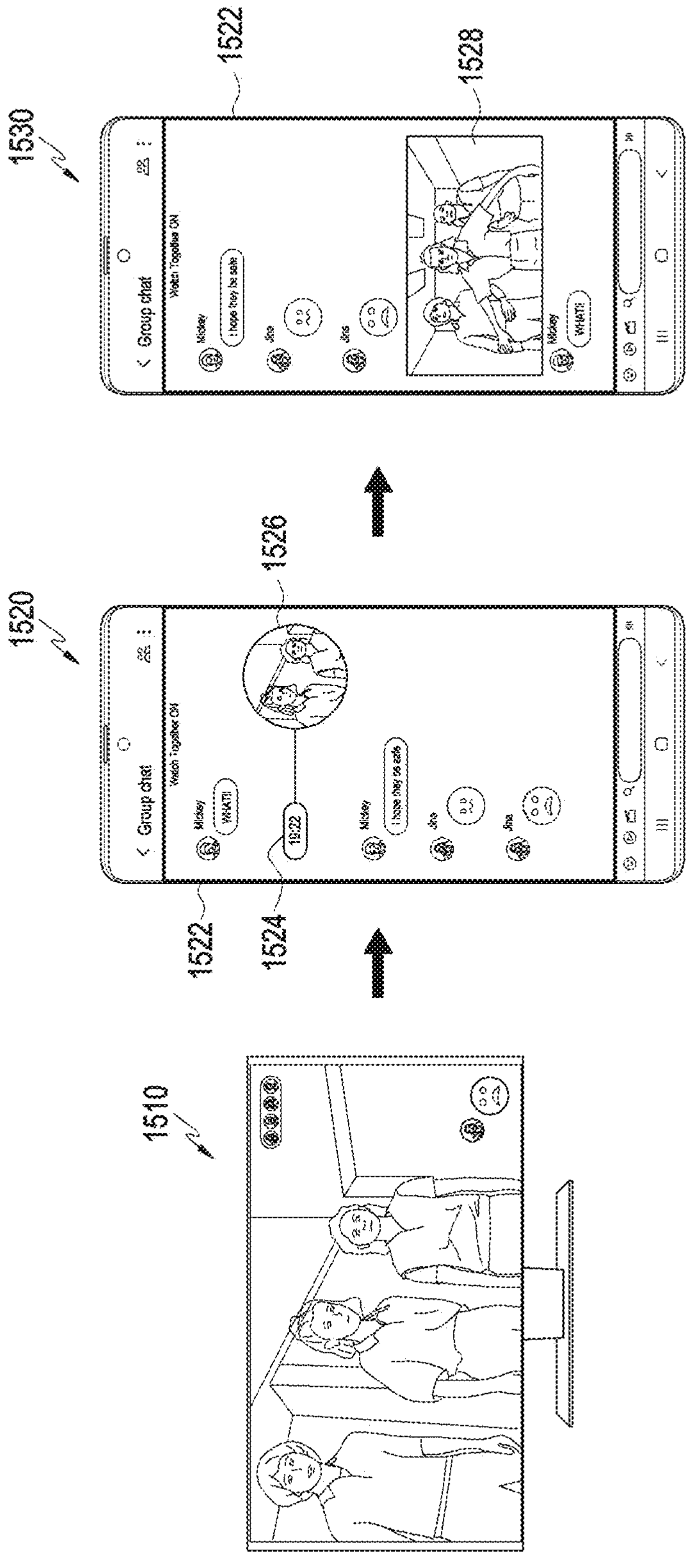
FIG. 15 is a view illustrating an example community service screen reflecting an image related to content of an external display device according to various embodiments.

FIG. 13 is a view illustrating a method for obtaining content of an external display device according to various embodiments. In FIG. 13, the electronic device 301 and the external display device 302 may be connected to each other, and the electronic device 301 may be in a state in which a message application related to content in which a plurality of viewers participate in relation to the content displayed on the external display device 302 is executed. A description will be made with reference to FIGS. 14 and 15 to help understanding of the description in FIG. 13. FIG. 14 is a view illustrating an example community service screen that changes in response to the degree of community service participation activation according to various embodiments. FIG. 15 is a view illustrating an example community service screen reflecting an image related to content of an external display device according to various embodiments.

Referring to FIG. 13, in operation 1305, the electronic device 301 may determine activation (e.g., conversation volume) of the chat room while executing a message application. According to an embodiment, meaningful information may be obtained using an algorithm model trained by the electronic device 301 or the message server 310 while the plurality of viewers perform a conversation in relation to the content currently being reproduced through the external display device 302. For example, in operation 1310, the message server 310 may obtain the conversation volume and the conversation content in the conversation and may identify whether there is a negative keyword for the content. If the message server 310 notifies the content service server 308 that there is no negative keyword for the content, the content service server 308 may grant the authority to capture the content in operation 1320. When the external display device 302 captures the scene of the content currently being reproduced and transfers the captured image to the electronic device 301 through the message server 310 in operation 1330 in response to the grant of the authority, the electronic device 301 may apply the received captured image to the chat room background in operation 1335.

For example, referring to FIG. 14, as indicated by reference numeral 1410, the execution screen 1415 of the message application including the chat window in which viewers are chatting in relation to content may be displayed on the electronic device 301. When the conversation volume in the chat window is greater than or equal to a designated number of times within a predetermined time, the electronic device 301 may recognize the chat room context and notify the external display device 302 of the context. Here, the designated number of times during the predetermined time may vary according to the number of viewers participating in the conversation. For example, if the number of viewers participating in the conversation increases, a criterion for determining the conversation volume for the predetermined time may also increase.

In response to the notification, as indicated by reference numeral 1420, the external display device 302 may capture a specific scene of the corresponding content and transfer the captured screen 1425 to the electronic device 301. For example, the content service server 308 (e.g., a content provider) may grant content capture authority, and accordingly, the external display device 302 may perform capture.

In response to the transfer of the captured screen, as indicated by reference numeral 1430, the electronic device 301 may display the captured screen, i.e., the captured image, as the background 1435 of the execution screen 1415 of the message application. The captured image may be applied in real-time, and when the conversation volume in the chat room is less than the designated number of times for the predetermined time, the original background image may be restored.

As another example, referring to FIG. 15, as indicated by reference numeral 1510, the external display device 302 may provide a specific scene of content being displayed, e.g., a main scene, to the electronic device 301. For example, while the electronic device 301 displays the execution screen of the message application, the electronic device 301 may associate and display the conversation content and the scene provided from the external display device 302, based on the conversation content. Accordingly, the timeline of the content being viewed and the conversation content at the time of the conversation in the chat room may be stored in conjunction with each other. Accordingly, as indicated by reference numeral 1520, a content scene 1526 mapped to a timeline 1524 may be displayed together on the execution screen 1522 of the message application of the electronic device 301. The content scene 1526 may be displayed in a minimum size (e.g., a thumbnail image) and then may be displayed in an enlarged size 1528 in response to a user input, as indicated by reference numeral 1530. By so doing, the main scene may be mapped to each specific section in the chat room, so that the user may easily grasp what conversation took place in what content scene.

As described above, as at least a portion, e.g., a specific scene, of the content displayed on the external display device 302 is associated and displayed according to the context of the chat room, the user may more easily grasp the context of the content when identifying the conversation content of the chat room later.

Meanwhile, when there is a negative keyword for the content in operation 1310, the function may not be applied to the user chat window in which the negative keyword is posted in operation 1315. For example, the function of applying the captured image to the background of the conversation screen may not be applied to the conversation screen displayed on the electronic device of the user posting a negative keyword. Here, the operation based on the trained algorithm model for obtaining meaningful information in the conversation with the counterpart may be performed in the electronic device 301, and may also be performed through the message server 310.

In the above description, an example has been described in which while a plurality of viewers chat in relation to content, meaningful conversation in the conversation, e.g., content-related data (e.g., captured image) based on the conversation content or conversation volume, is reflected and displayed on the message application screen, but the type of content-related data reflected on the message application screen based on the conversation volume or conversation content may be diversified.

Figure 16:
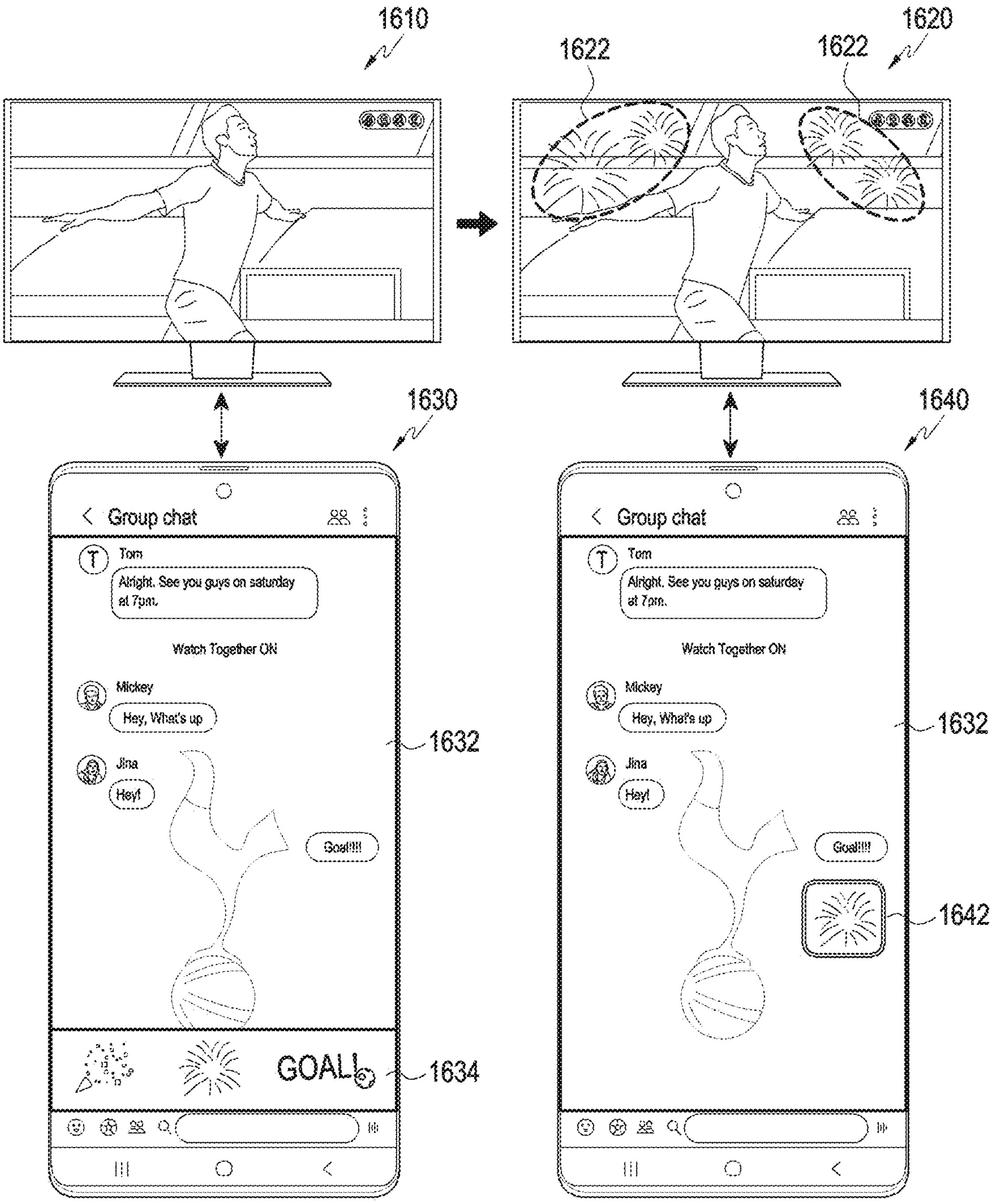
FIG. 16 is a view illustrating an example content service screen and community service screen based on real-time bi-directional content-related information according to various embodiments.

FIG. 16 is a view illustrating an example content service screen and community service screen based on real-time bi-directional content-related information according to various embodiments.

Referring to FIG. 16, as indicated by reference numeral 1610, the external display device 302 may grasp a context related to the displayed content in real-time. Real-time context identification related to content may be performed by the external display device 302 or the content service server 308 connected to the external display device 302. The content-related context may be determined based on at least one of text, an image, or an embedded sound in the content. For example, when the content context is a context in which a goal is scored in a soccer game, the context related to the content may be determined based on text such as a score, a sub-title, or a text graphic element, an image such as face recognition, an LED electronic display phrase, a goal image or an emblem image, or a sound such as commentary voice content of a commentator, a cheer, or a fanfare.

The result of recognizing the context related to the content may be transferred to the electronic device 301, and as indicated by reference numeral 1630, the electronic device 301 may sort and display visual effects 1634 of at least one user-selectable graphic object on at least a portion of the execution screen 1632 of the message application, based on the recognition result.

The user may select any one of the visual effects 1634 of the at least one graphic object, and as indicated by reference numeral 1640, the electronic device 301 may reflect and display the visual effect 1642 of the graphic object according to the user selection on the chat room of the execution screen 1632 of the message application.

Meanwhile, the result of recognizing the real-time context of the content may be reflected not only to the electronic device 301 but also to the content displayed on the external display device 302. As indicated by reference numeral 1620, the external display device 302 may reflect and output the visual effect 1622 corresponding to the content and the related context in a layout form on the content. The visual effect 1622 may be provided from the content service server 308.

Figure 17:
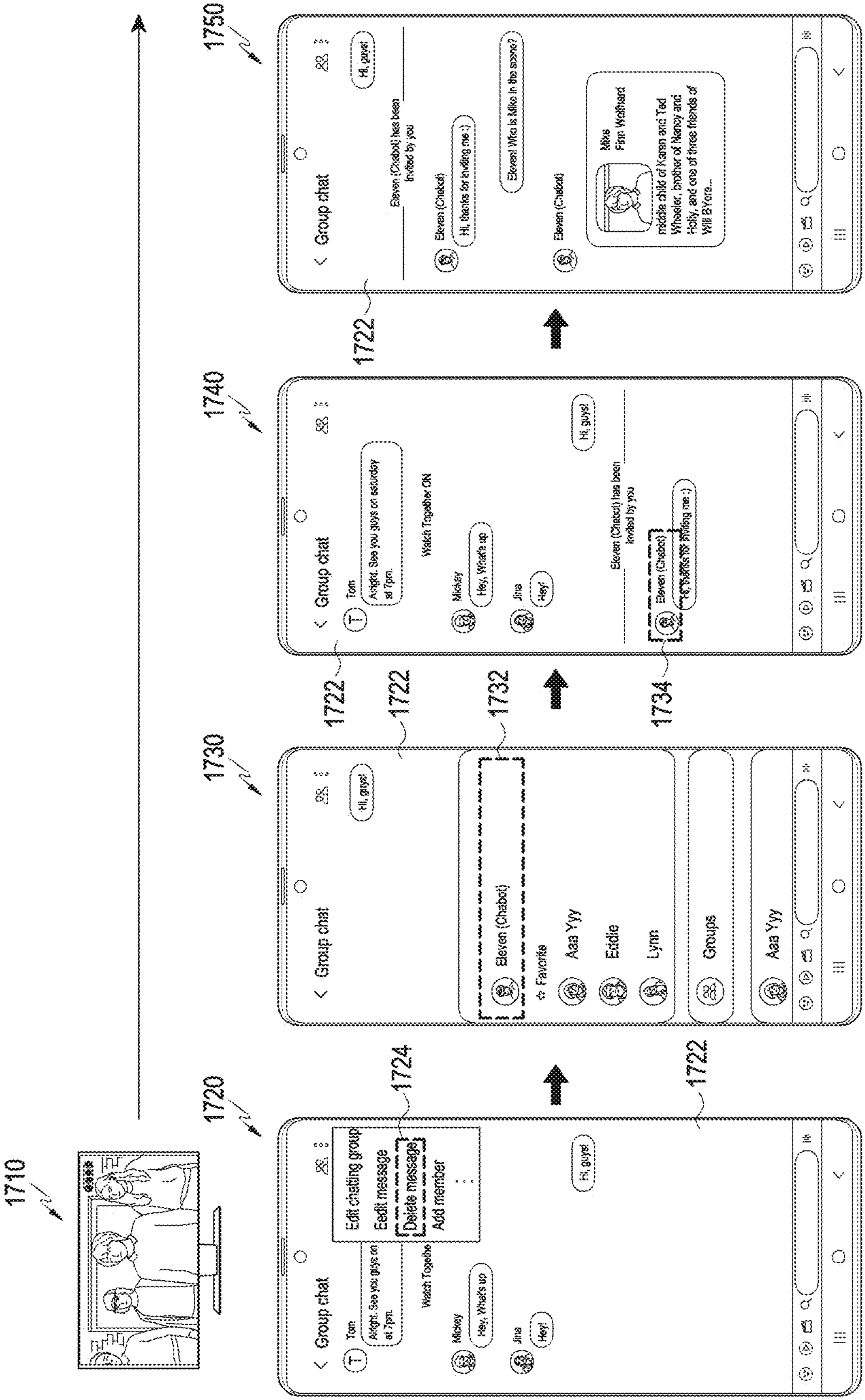
FIG. 17 is a view illustrating an example screen when inviting a dedicated chatbot to a community service according to various embodiments.

FIG. 17 is a view illustrating an example screen when inviting a dedicated chatbot to a community service according to various embodiments.

Referring to FIG. 17, in a state in which the content service 1710 being viewed through the external display device 302 and the message application of the electronic device 301 interoperate with each other, as indicated by reference numeral 1720, the user may add a member to be invited to the group room through a menu 1724 provided on the execution screen 1722 of the message application of the electronic device 301. For example, as indicated by reference numeral 1730, the electronic device 301 may select and invite a chatbot 1732 dedicated for the content being viewed, may perform a chat with the content-dedicated chatbot 1734 in the chat room as indicated by reference numeral 1740, and may display a chatbot answer to a content-based question that is being viewed as indicated by reference numeral 1750. The chatbot may provide answers to questions based on the drama episode currently being viewed, and when a question is asked after calling the chatbot name, the question may be delivered to the chatbot.

Figure 18:
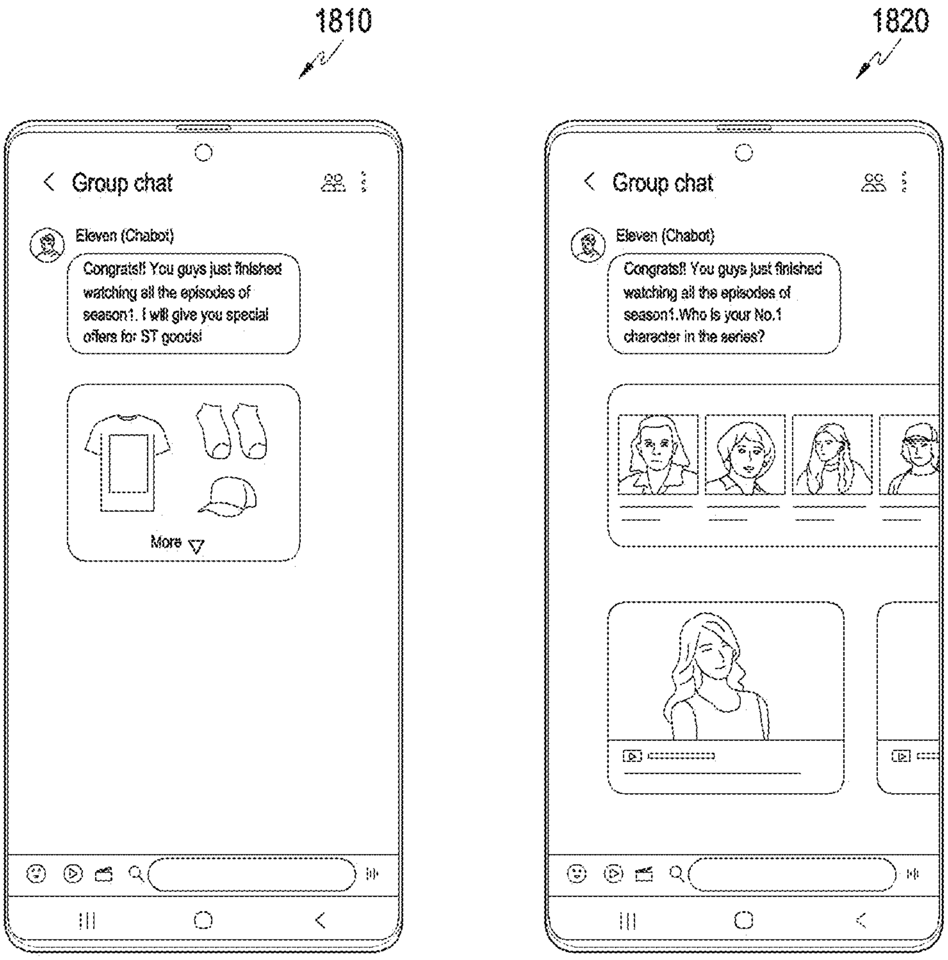
FIG. 18 is a view illustrating an example community service screen providing additional information after viewing content according to various embodiments.

The content-dedicated chatbot may provide the user with various services related to content in addition to those described above. For example, referring to FIG. 18, as indicated by reference numeral 1810, when viewing of a drama season is completed, the electronic device 301 may display a screen providing a benefit for a related product. FIG. 18 is a view illustrating an example community service screen providing additional information after viewing content according to various embodiments. Further, as indicated by reference numeral 1820, the electronic device 301 may display a screen for providing derivative content related to the content that has been viewed. For example, recommendation information tailored to the taste of each viewer, including additional videos of content that has been viewed and related products, may be provided. As such, while conventional chatbots enable only 1:1 conversation, various embodiments may allow the user to ask various questions related to content and easily obtain answers thereto since the chatbot may be invited to the group chat room.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:

communication circuitry;

a display;

at least one processor; and memory storing instructions that, when executed by the at least one processor, cause the electronic device to:

establish a connection between an external display device and the electronic device through the communication circuitry;

execute a message application that allows participation of the electronic device and at least one external electronic device;

obtain data related to content displayed on the external display device based on the connection between the external display device and the electronic device; and display, on the display, an execution screen of the message application, wherein the execution screen dynamically updates a set of selectable emojis displayed on the execution screen in synchronization with a scene of the content displayed on the external display device, wherein the set of selectable emojis is automatically generated based on a facial expression analysis of one or more characters appearing in the scene of the content, and wherein the dynamically updated set of selectable emojis replaces previously displayed emojis in the execution screen of the message application.

2. The electronic device of claim 1, wherein the execution screen of the message application is configured to change a first component of the execution screen to a second component in response to the data related to the content.

3. The electronic device of claim 2, wherein the first component and the second component include at least one of a theme, an emoji, an emoticon, or a background image.

4. The electronic device of claim 1, wherein the instructions further cause the electronic device to:

receive a sorted group of two or more emojis generated based on the facial expression analysis of the one or more characters appearing in the content displayed on the external display device;

determine priorities of the two or more emojis based on emotional states detected from the facial expression analysis and contextual information of the content;

arrange the two or more emojis according to the determined priorities; and display at least a portion of the sorted group of the two or more emojis in the execution screen of the message application, wherein an updated sorted group of the two or more emojis is generated and displayed in response to a change in a scene of the content displayed on the external display device.

5. A viewer-participable content providing method of an electronic device, comprising:

establishing a connection between an external display device and the electronic device;

executing a message application that allows participation of the electronic device and at least one external electronic device;

obtaining data related to content displayed on the external display device based on the connection between the external display device and the electronic device; and displaying an execution screen of the message application on a display of the electronic device, wherein displaying the execution screen comprises dynamically updating a set of selectable emojis displayed on the execution screen in synchronization with a scene of the content displayed on the external display device, wherein the set of selectable emojis is automatically generated based on a facial expression analysis of one or more characters appearing in the scene of the content.

6. The viewer-participable content providing method of claim 5, wherein the execution screen of the message application is configured to change a first component of the execution screen to a second component in response to the data related to the content, and wherein the first component and the second component include at least one of a theme, an emoji, an emoticon, or a background image.

7. A computer program product comprising a non-transitory storage medium storing instructions, which when executed by at least one processor of an electronic device, cause the electronic device to perform a plurality of operations comprising:

establishing a connection between an external display device and the electronic device;

executing a message application that allows participation of the electronic device and at least one external electronic device;

obtaining data related to content displayed on the external display device based on the connection between the external display device and the electronic device; and displaying an execution screen of the message application on a display of the electronic device, wherein displaying the execution screen comprises dynamically updating a set of selectable emojis displayed on the execution screen in synchronization with a scene of the content displayed on the external display device, wherein the set of selectable emojis is automatically generated based on a facial expression analysis of one or more characters appearing in the scene of the content, and wherein the dynamically updated set of selectable emojis replaces previously displayed emojis in the execution screen of the message application.

8. The computer program product of claim 7, wherein the execution screen of the message application is configured to change a first component of the execution screen to a second component in response to the data related to the content, and wherein the first component and the second component include at least one of a theme, an emoji, an emoticon, or a background image.

* * * * *